(12) United States Patent
Ohnishi et al.

(10) Patent No.: US 12,057,081 B2
(45) Date of Patent: Aug. 6, 2024

(54) DISPLAY DEVICE AND CONTROL METHOD

(71) Applicant: Panasonic Intellectual Property Management Co., Ltd., Osaka (JP)

(72) Inventors: Masaaki Ohnishi, Kyoto (JP); Shinji Masuda, Osaka (JP); Jun Araya, Kyoto (JP); Masaomi Shibata, Hyogo (JP); Tatsuya Ina, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/003,458
(22) PCT Filed: Jul. 8, 2021
(86) PCT No.: PCT/JP2021/025860
§ 371 (c)(1),
(2) Date: Dec. 27, 2022
(87) PCT Pub. No.: WO2022/014473
PCT Pub. Date: Jan. 20, 2022

(65) Prior Publication Data
US 2023/0245630 A1   Aug. 3, 2023

(30) Foreign Application Priority Data
Jul. 14, 2020   (JP) ................. 2020-120858

(51) Int. Cl.
*G09G 3/36* (2006.01)
*G02F 1/133* (2006.01)
*G02F 1/1333* (2006.01)

(52) U.S. Cl.
CPC ............ *G09G 3/36* (2013.01); *G02F 1/133* (2013.01); *G02F 1/1333* (2013.01);
(Continued)

(58) Field of Classification Search
CPC ......... G02F 1/133308; G02F 1/133331; G02F 1/13332; G02F 1/133374; G02F 1/133512;
(Continued)

(56) References Cited

U.S. PATENT DOCUMENTS

| 5,406,305 A | 4/1995 | Shimomura et al. |
|---|---|---|
| 2010/0171858 A1 | 7/2010 | Osawa |

(Continued)

FOREIGN PATENT DOCUMENTS

| JP | 06-214508 A | 8/1994 |
|---|---|---|
| JP | 2010-103026 A | 5/2010 |

(Continued)

OTHER PUBLICATIONS

International Search Report issued on Sep. 14, 2021 in International Patent Application No. PCT/JP2021/025860, with English translation.

*Primary Examiner* — Xuemei Zheng
(74) *Attorney, Agent, or Firm* — Rimon P.C.

(57) ABSTRACT

A display device includes: a display which includes a display screen on which a video is displayed; a decorative sheet disposed on a display screen side of the display, is larger than the display screen in a front view of the display screen, and covers the display screen, the decorative sheet including a first region which overlaps with the display screen in the front view and a second region which does not overlap with the display screen in the front view; and a controller which controls a luminance of the video that is displayed by the display, based on (i) an illuminance of ambient light around the display and the decorative sheet and (ii) first information indicating a relationship between the illuminance and appearances of a third region corresponding to a black display region of the video in the first region and the second region on the decorative sheet.

15 Claims, 14 Drawing Sheets

(52) U.S. Cl.
CPC ............... *G09G 2320/0233* (2013.01); *G09G 2320/0626* (2013.01); *G09G 2360/144* (2013.01)

(58) Field of Classification Search
CPC .. G02F 1/133; G02F 1/13318; G02F 1/13306; G02F 1/1333; G09G 3/36; G09G 2360/144; G09G 2380/16; G09G 2320/0626; G09G 2320/0233; G09G 5/10
See application file for complete search history.

(56) References Cited

U.S. PATENT DOCUMENTS

| | | | |
|---|---|---|---|
| 2013/0155125 A1 | 6/2013 | Inamura | |
| 2016/0258631 A1 | 9/2016 | Aihara et al. | |
| 2018/0267307 A1* | 9/2018 | Yoshida | G02F 1/13318 |
| 2020/0081285 A1 | 3/2020 | Araki et al. | |
| 2020/0319497 A1 | 10/2020 | Matsumoto et al. | |
| 2022/0111621 A1* | 4/2022 | Watanabe | B32B 27/40 |
| 2022/0176821 A1* | 6/2022 | Hart | G02F 1/133308 |

FOREIGN PATENT DOCUMENTS

| | | |
|---|---|---|
| JP | 2010-160272 A | 7/2010 |
| JP | 2012-150418 A | 8/2012 |
| JP | 5174982 B1 | 4/2013 |
| JP | 2013-148870 A | 8/2013 |
| WO | 2015/068393 A1 | 5/2015 |
| WO | 2017/122300 A1 | 7/2017 |
| WO | WO-2018083217 A1 * | 5/2018 |
| WO | 2018/110496 A1 | 6/2018 |

* cited by examiner

Non-display mode

Display mode

Non-display mode

Display mode

Non-display mode

Display mode

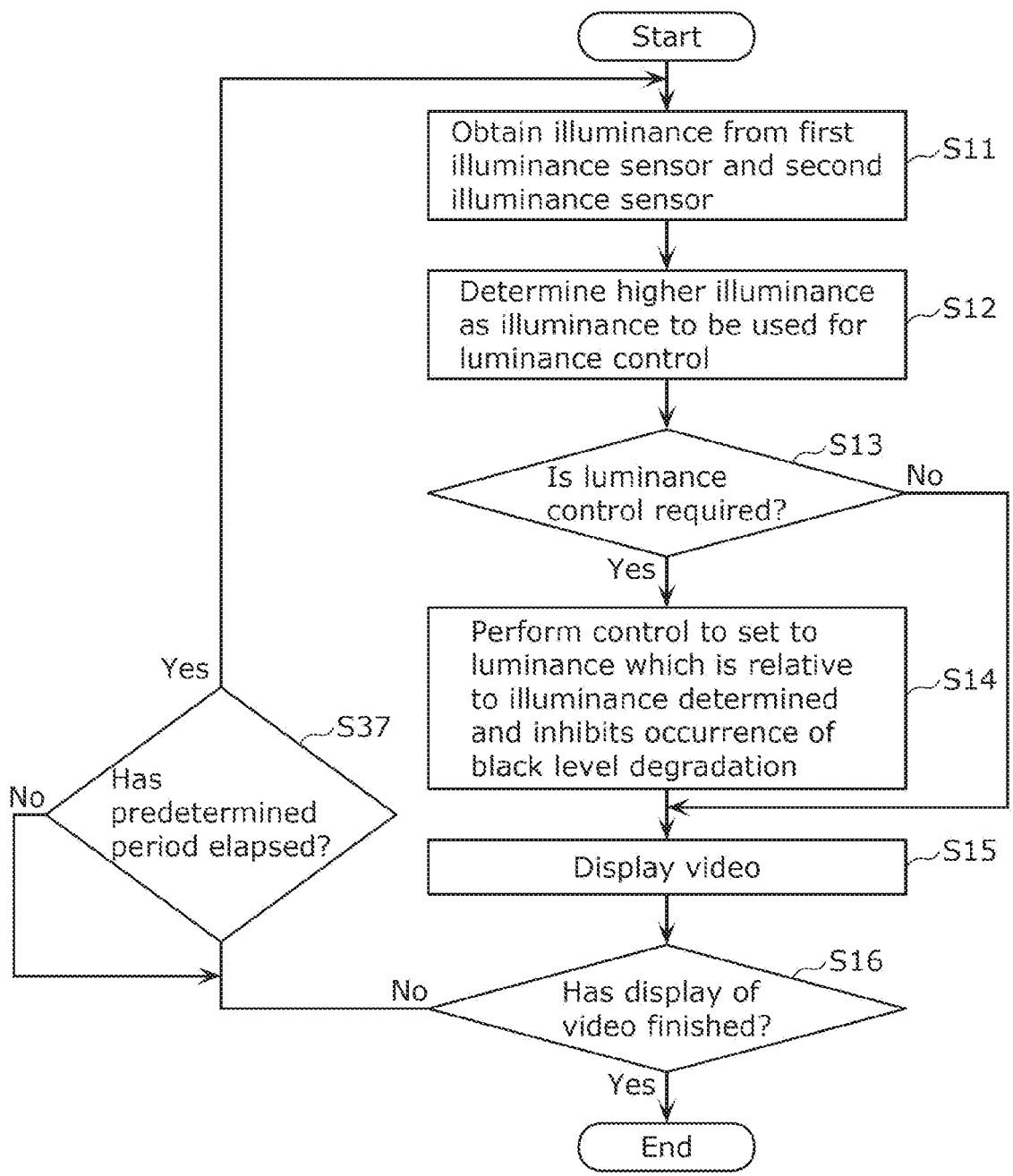

DISPLAY DEVICE AND CONTROL METHOD

CROSS-REFERENCE OF RELATED APPLICATIONS

This application is the U.S. National Phase under 35 U.S.C. § 371 of International Patent Application No. PCT/JP2021/025860, filed on Jul. 8, 2021, which in turn claims the benefit of Japanese Patent Application No. 2020-120858, filed on Jul. 14, 2020, the entire disclosures of which Applications are incorporated by reference herein.

TECHNICAL FIELD

The present disclosure relates to a display device and a control method.

BACKGROUND ART

A display device such as a liquid crystal display has a display quality that changes when being affected by ambient light around the display device. For example, when a video is displayed irrespective of ambient light around the display device, the visibility (display quality) of the video may reduce in such a manner that the video is seen with glare or the black display portion is seen brighter than expected. In view of this, Patent Literature 1 discloses a display device capable of adjusting display luminance of the display device according to ambient light around the display device in order to inhibit reduction in the visibility of a video.

CITATION LIST

Patent Literature

[PTL 1] Japanese Patent No. 5174982

SUMMARY OF INVENTION

Technical Problem

Display devices including a decorative sheet that covers the entirety of a display screen of a liquid crystal display (one example of a display) have been studied. Such a display device displays a video on the decorative sheet by means of the display displaying the video.

Such a display device is desired to be a device in which the display is not visually recognized by a user when the display is displaying the video. The visibility of the display changes according to ambient light around the display device.

Patent Literature 1 does not disclose a technique related to inhibiting the display from being visually recognized by the user even when ambient light changes.

In view of this, the present disclosure provides a display device capable of inhibiting the display from being visually recognized by the user even when ambient light around the display device changes.

Solution to Problem

A display device according to an aspect of the present disclosure includes: a display which includes a display screen on which a video is displayed; a decorative sheet which is disposed on a display screen side of the display, is larger than the display screen in a front view of the display screen, and covers the display screen, the decorative sheet including a first region which overlaps with the display screen in the front view and a second region which does not overlap with the display screen in the front view; and a controller which controls a luminance of the video that is displayed by the display, based on (i) an illuminance of ambient light around the display and the decorative sheet and (ii) first information indicating a relationship between the illuminance and appearances of a third region and the second region on the decorative sheet, the third region corresponding to a black display region of the video in the first region.

A control method according to an aspect of the present disclosure is a method of controlling a display device including: a display which includes a display screen on which a video is displayed; a decorative sheet which is disposed on a display screen side of the display, is larger than the display screen in a front view of the display screen, and covers the display screen, the decorative sheet including a first region which overlaps with the display screen in the front view and a second region which does not overlap with the display screen in the front view. The method includes: controlling a luminance of the video that is displayed by the display, based on (i) an illuminance of ambient light around the display device and (ii) information indicating a relationship between the illuminance and appearances of a third region and the second region on the decorative sheet, the third region corresponding to a black display region of the video in the first region.

Advantageous Effects of Invention

The display device according to the present disclosure is capable of inhibiting the display from being visually recognized by the user even when ambient light around the display device changes, in the display device including the decorative sheet.

BRIEF DESCRIPTION OF DRAWINGS

FIG. 14 is a flow chart indicating operations by a display device according to Variation 3 of the embodiment.

DESCRIPTION OF EMBODIMENTS

[Underlying Knowledge Forming the Basis of the Present Disclosure]

Prior to describing the embodiments of the present disclosure, the underlying knowledge forming the basis of the present disclosure is explained.

Figure 1A:
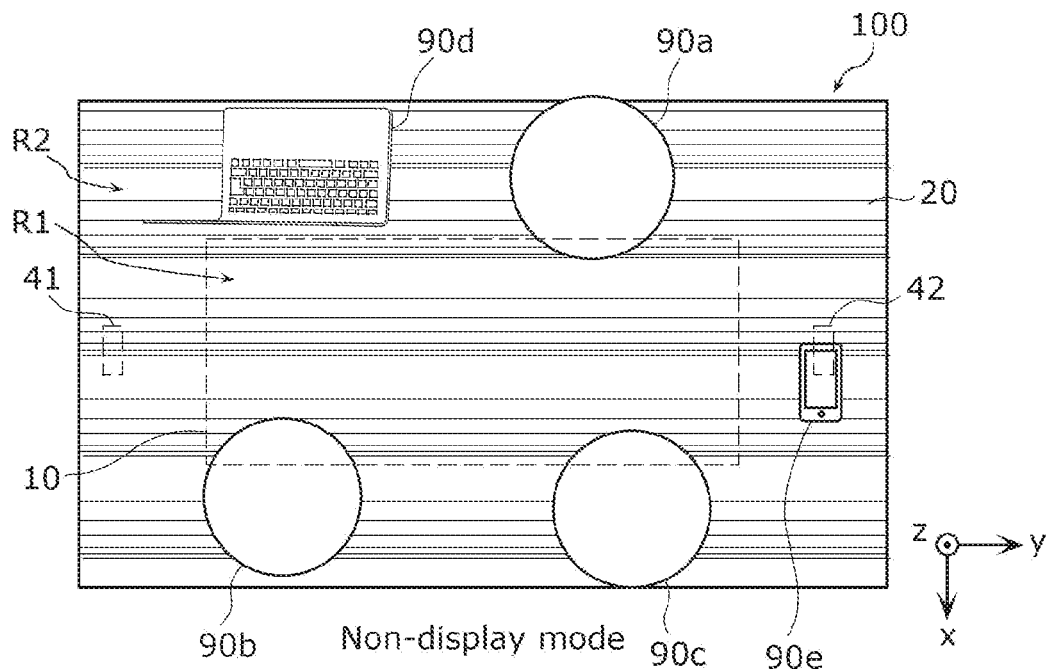
FIG. 1A is a diagram for illustrating a non-display mode in an application example of a display device according to an embodiment.
Figure 1B:
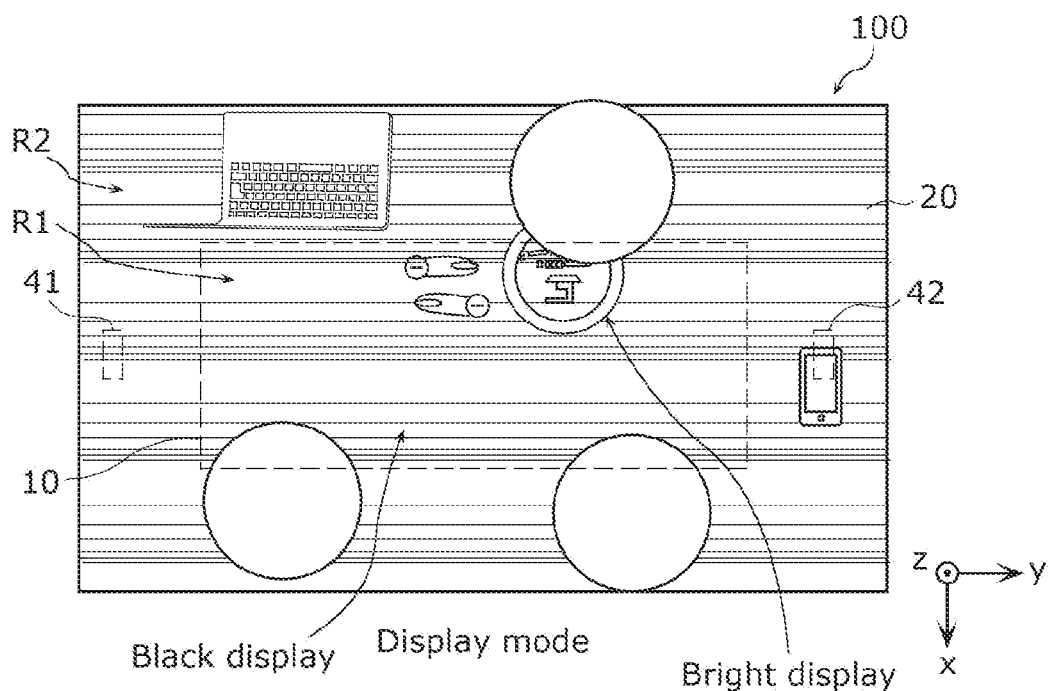
FIG. 1B is a diagram for illustrating a display mode in an application example of a display device according to the embodiment.

As described in the "Technical Problem" section, display devices including a decorative sheet that covers the entirety of a display screen have been studied. One example of such a display device is described with reference to FIGS. 1A and 1B each illustrating an application example of the display device according to the embodiment. FIG. 1A is a diagram for illustrating a non-display mode in an application example of display device 100 according to the embodiment. FIG. 1B is a diagram for illustrating a display mode in an application example of display device 100 according to the embodiment. Each of FIGS. 1A and 1B illustrates an example in which display device 100 is applied to a table that is used in a café, or the like. It is to be noted that display device 100 may be applied to a table that is used in an office, a school, a library, a home, or the like other than the café. The table is one example of the target.

As illustrated in each of FIGS. 1A and 1B, display device 100 may be installed in a table that is one example of the target. In this case, the table includes: a table body including a recess (see recess 70a illustrated in FIG. 2 to be described later) for housing display device 100; and display device 100 housed in the recess. The recess is a recess for attaching display device 100 to the table body (for example, embedding display device 100 into the table body). The recess houses at least display 10.

Display device 100 includes at least display 10 and decorative sheet 20. Details of display device 100 are described later. When a user sees the table, decorative sheet 20 is disposed between the user and display 10.

Display 10 displays a video onto decorative sheet 20. It is to be noted that a video here may be one or more still mages or a moving image.

Decorative sheet 20 is provided to hide (conceal) display device 100 in a state in which display device 100 is embedded in the target. In each of the examples in FIGS. 1A and 1B, decorative sheet 20 is decorated with a wood tone. Wood tone decoration is one example of target-specific decoration.

In this way, as illustrated in FIG. 1A, when display 10 is controlled in the non-display mode, that is, when display 10 does not display the video, the user visually recognizes the wood tone decoration formed on decorative sheet 20. Stated differently, the appearance of display device 100 harmonizes with the appearance of the table. Thus, it is difficult for display device 100 to be seen attached to the table. In other words, decorative sheet 20 can inhibit display device 100 from being visible.

In addition, as illustrated in FIG. 1B, when display 10 is controlled in the display mode, that is, when display 10 displays the video, the user can visually recognize the video displayed by display 10. The user can visually recognize the video floating on decorative sheet 20 (see "bright display" illustrated in FIG. 1B). Decorative sheet 20 can be said to have a function as a screen.

At this time, it is excellent that display 10 disposed on the z-axis negative side of decorative sheet 20 (for example, housed in the recess) is not visually recognized by the user. For example, it is excellent that, when display device 100 is seen from the z-axis direction, a region in which display 10 is performing black display and the region around display 10 (for example, the region enclosing display 10, second region R2 illustrated in FIG. 1B) look identical or similar to each other (have identical or similar appearances).

It is to be noted that being similar means that there is a difference in appearance that does not allow the user to recognize that display 10 is disposed. Furthermore, black display does not mean display of ideally complete black (luminance 0 cd/m$^2$), but means display of a low-level voltage (for example, the lowest-level voltage or a low-level voltage close to the lowest-level voltage). Black display can be said as display of a low-level voltage that can be regarded substantially as black and dark display. Black display may be, for example, display at 5% or less of the maximum luminance that can be used for display by display device 100. In addition, visually recognizing means that the user can recognize that display 10 is disposed.

It is to be noted that, for example, tableware 90a to 90c (for example, dishes), electronic device 90d, mobile terminal 90e, etc., may be placed on decorative sheet 20. For example, electronic device 90d is a notebook PC, and mobile terminal 90e is for example a smartphone, tablet terminal, or the like.

Display device 100 as described above is desired to be a device in which display 10 is not visually recognized by the user when display 10 is displaying the video. For example, it is desired that display 10 is not visually recognized by the user even when ambient light around display 10 changes.

In view of this, the inventors of the present application have made diligent consideration with respect to a display device and a control method which make it possible to inhibit display 10 from being visually recognized by the user even when ambient light around display 10 changes in display device 100 including decorative sheet 20, and have devised the display device and the control method described below. It is to be noted that ambient light is light that is other than video light that is emitted by display 10 and that enters display device 100. The ambient light includes illumination light, solar light, etc., for example.

Hereinafter, embodiments are described in detail with reference to the drawings. The embodiments described below each indicate a general or specific example. The numerical values, shapes, materials, elements, the arrangement and connection of the elements, steps, the order of the steps, etc., in the following embodiments are mere examples, and therefore are not intended to limit the scope of the present disclosure. Among elements in the following embodiments, those not recited in any one of the independent claims are described as optional elements.

It is to be noted that the respective diagrams are schematic diagrams, and are not necessarily precisely illustrated. In each of the diagrams, elements that are substantially the same as those in one or more of the diagrams are assigned with the same reference signs, and overlapping descriptions may be omitted or simplified.

In the present specification and the diagrams, the x-axis, the y-axis, and the z-axis represent the three axes in a three-dimensional orthogonal coordinate system. In the embodiments, the z-axis is the axis orthogonal to the display surface of the display (for example, parallel to the optical axis of the display). The x-axis and y-axis are orthogonal to the z-axis, for example. The display surface is, for example, parallel to the plane formed by the x-axis and y-axis. As used in the present specification, a front view means, for example, a view from a direction parallel to the z-axis direction.

In the present specification, terms indicating relationships between elements such as "parallel", "the same", or "equal", terms indicating shapes of elements such as "rectangular", and numerical ranges refer not only to their strict meanings, but each encompass a range of substantially equivalents, such as a range of deviations of a few percent.

EMBODIMENT

[1. Configuration of Display Device]

Figure 2:
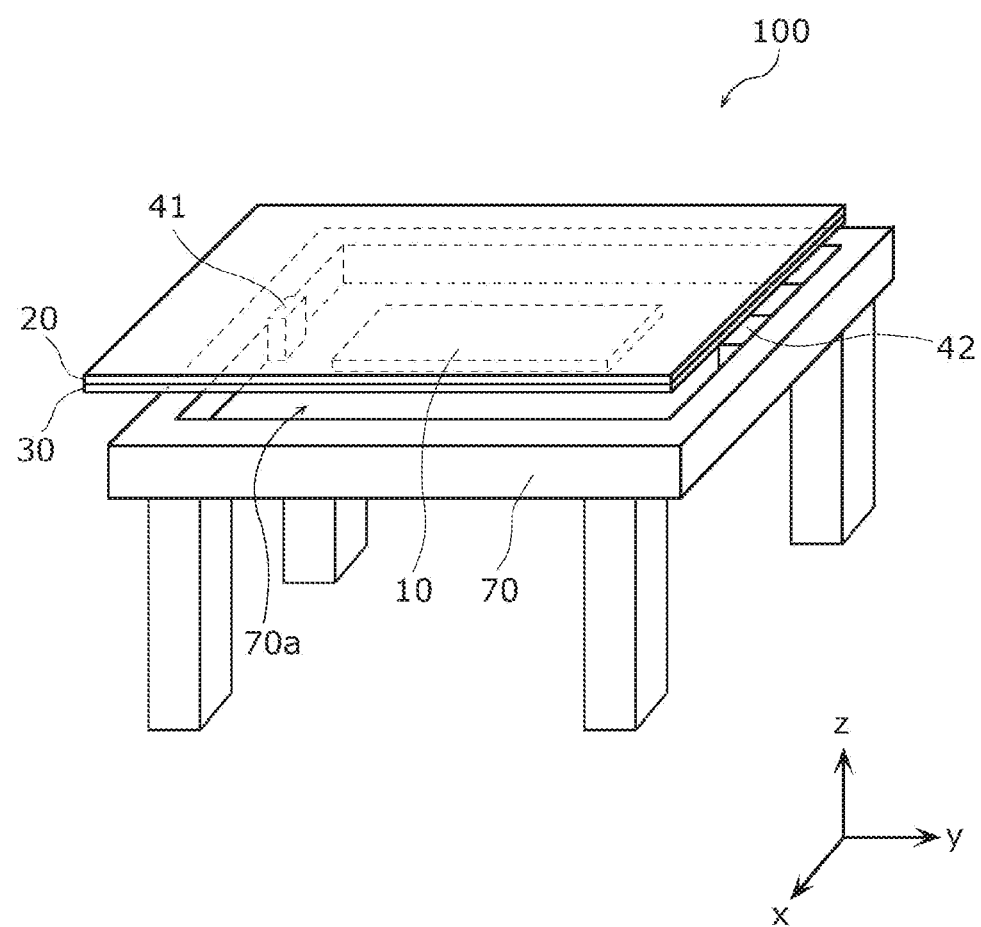
FIG. 2 is a perspective view schematically illustrating a partial exploded view of the display device according to the embodiment.
Figure 3:
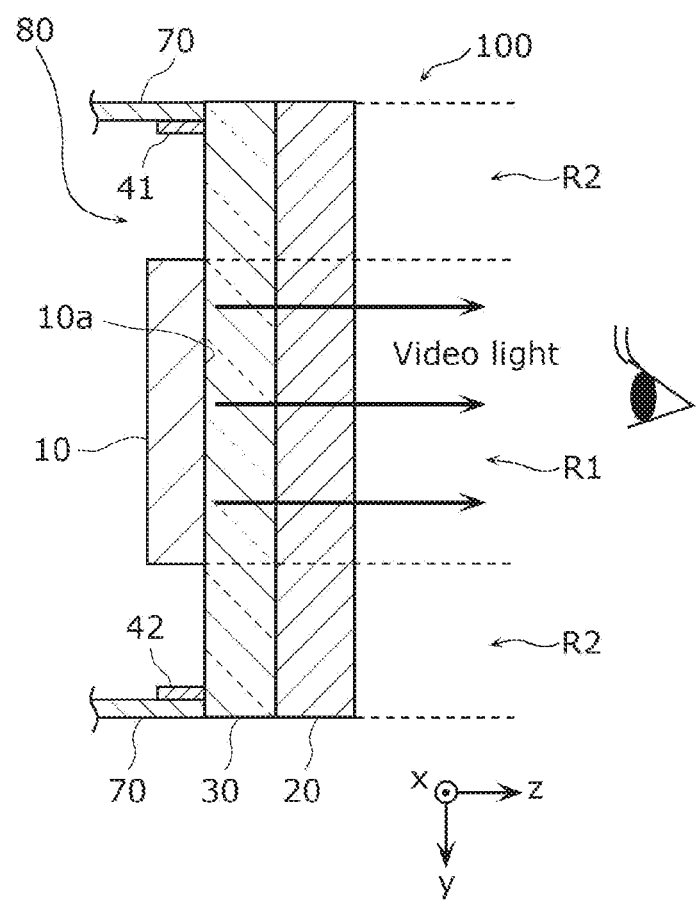
FIG. 3 is a cross sectional view schematically illustrating a cross sectional structure of the display device according to the embodiment.
Figure 4:
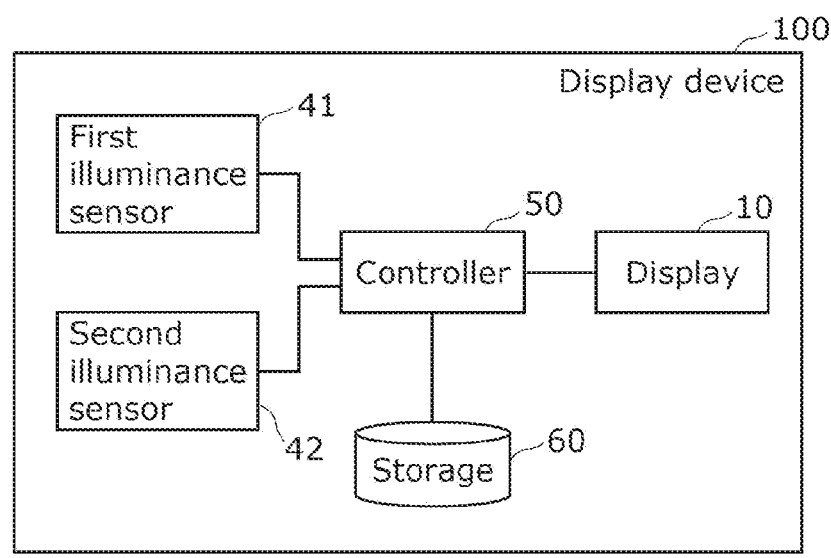
FIG. 4 is a block diagram illustrating a functional structure of the display device according to the embodiment.

First, a configuration of display device 100 according to an embodiment is described with reference to FIGS. 2 to 5, in addition to FIGS. 1A and 1B. FIG. 2 is a perspective view schematically illustrating a partial exploded view of display device 100 according to the embodiment. FIG. 3 is a cross sectional view schematically illustrating a cross sectional structure of display device 100 according to the embodiment. FIG. 4 is a block diagram illustrating a functional structure of display device 100 according to the embodiment. It is to be noted that, in FIG. 2, table body 70, display 10, decorative sheet 20, and transparent plate 30 are illustrated in an exploded view.

As illustrated in FIG. 2, display device 100 is attached to table body 70 and used. Display device 100 is an embedded display device that is embedded in table body 70. Display device 100 is embedded in recess 70a formed in table body 70 and is used. It is only necessary that at least display 10 among the constituent elements of display device 100 is embedded in the target. In addition, being embedded means that at least display 10 is located inside the target. In addition, display device 100 is embedded in the target so that the user can visually recognize decorative sheet 20.

Hereinafter, an example in which the target is a wood tone table as illustrated in FIGS. 1A and 1B is described. However, targets are not limited thereto. It is to be noted that the target is placed inside a home, for example. Stated differently, also display device 100 is placed inside the home, for example.

As illustrated in FIGS. 2 to 4, display device 100 includes display 10, decorative sheet 20, transparent plate 30, first illuminance sensor 41, second illuminance sensor 42, controller 50, and storage 60. As illustrated in FIGS. 2 and 3, display 10, transparent plate 30, and decorative sheet 20 are arranged in the listed order. Specifically, transparent plate 30 and decorative sheet 20 are arranged on a display screen 10a side of display 10 in the listed order. Display 10 is one example of an optical function unit. Display screen 10a is one example of a surface.

Display device 100 may be attached to configure a surface of the target. Display device 100 may be attached, for example, so that decorative sheet 20 is on the same surface on which the target is placed. Stated differently, display device 100 may be attached to be embedded in the target so that decorative sheet 20 is flush with the surface on which the target is placed.

Display 10 includes display surface 10a on which a video is displayed, and displays a video on display surface 10a. Display 10 includes a plurality of pixels. For example, display 10 is, but not limited to, a liquid crystal display or an electroluminescent (EL) display. Display 10 may be, for example, a light emitting diode (LED) display in the cases in which an increased luminance of the video to be displayed in display device 100 is desired. It is to be noted that, in this embodiment, display 10 is particularly advantageous in a display device (for example, a display device which does not include a display panel capable of performing self-emission of light) which is incapable of displaying ideally complete black due to the principle of a liquid crystal display, or the like.

The optical axis (for example, the z-axis direction) of video light that is emitted by display 10 and the arrangement direction (see FIG. 3) of display 10 and decorative sheet 20 are, for example, parallel to each other. In addition, video light that is emitted by display 10 may, for example, enter decorative sheet 20 without any optical member other than transparent plate 30. For example video light that is emitted by display 10 may enter decorative sheet 20 without any light reflective member. In addition, in a front view, the size of the region in which display 10 is performing bright display and the size of the bright display (see FIG. 1A) displayed on decorative sheet 20 are, for example, the same (have the same size). It is to be noted that the same size used here means that the region in which display 10 is performing bright display is not intentionally enlarged or reduced.

It is to be noted that, in this embodiment, display 10 is smaller than decorative sheet 20 and transparent plate 30 in the front view. For this reason, in the front view, there is space 80 defined by transparent plate 30 and table body 70 around display 10. It is to be noted that, in this embodiment, space 80 is present enclosing display 10 in the front view as a non-limiting example.

Display 10 is disposed to be in contact with transparent plate 30. Specifically, display 10 is disposed such that display screen 10a of display 10 is in contact with the z-axis negative side surface of transparent plate 30. It is to be noted that display 10 may be attached to transparent plate 30 via an adhesive layer (not illustrated). The adhesive layer is, for example, a highly transparent adhesive member such as an optical clear adhesive (OCA).

It is to be noted that display 10 may include a backlight (not illustrated). The liquid crystal display is configured to include, for example, a liquid crystal panel and a backlight. The backlight is a surface light source which emits light toward a display panel such as a liquid crystal panel. The backlight is an LED backlight including LEDs as light sources, as a non-limiting example.

Decorative sheet 20 has a light transmitting property, and is disposed on the display surface 10a side of display 10. In this embodiment, in the front view of display screen 10a, decorative sheet 20 is configured to cover display screen 10a and space 80 around display 10 (for example, display screen 10a). In the front view, decorative sheet 20 is larger than display 10 (for example, display screen 10a), and covers display screen 10a. For example, decorative sheet 20 covers the entirety of display 10. In addition, decorative sheet 20 includes first region R1 (see FIGS. 1A and 1B) which overlaps with display screen 10a in the front view and second region R2 (see FIGS. 1A and 1B) which does not overlap with display screen 10a in the front view. In this embodiment, second region R2 is a region which covers space 80 in the front view.

First region R1 is a part of a region or the entirety of the region in which a video is displayed (bright display illustrated in FIG. 1B) by display 10. For example, first region R1 includes a bright display region in which bright display is performed by video light that has been emitted by display 10 and has passed through decorative sheet 20 and a black display region in which black display is performed for enabling visual recognition of the decoration by the reflected light of outside light reflected on the surface of first region R1. The video light that has passed through decorative sheet 20 means video light which has passed through the decoration made on decorative sheet 20.

The black display region on decorative sheet 20 is one example of a third region corresponding to the black display region of the video in first region R1. The black display region on decorative sheet 20 is, for example, a region which overlaps with the black display region of the video in the front view. The third region can be said to be a region other than the bright display region in first region R1. The position and size of the third region in first region R1 can change according to the display content of display 10. In addition, when bright display is performed in the entirety of first region R1, there is a possibility that no third region is formed.

Second region R2 is a region in which no video is displayed by display 10, stated differently, is a region in which decoration is always visually recognized, and in which decoration is visually recognized due to the reflected light of outside light reflected on the surface of second region R2.

Although the shape of decorative sheet 20 is rectangular as a non-limiting example, but it is to be noted that the shape may be determined appropriately according to the target to which decorative sheet 20 is to be attached.

Decorative sheet 20 is decorated according to the appearance of the target. The decoration is applied to the entire surface of decorative sheet 20, for example, but may be applied partially. It is to be noted that the term "appearance" includes, for example, the pattern, the color tone, the gloss, and the texture of the target. The term "appearance" may also include the shape of the surface of the target. Decorative sheet 20 is formed by, but not limited to, printing a pattern such as a wood tone onto a light-transmissive film. In addition, decorative sheet 20 can be said designed layer that forms a desired design.

The decoration applied to decorative sheet 20 should be, for example, a decoration that makes display device 100 and the target appear as an integral unit when display device 100 is embedded in the target (for example, the decoration should make it difficult to see that display device 100 is present). The decoration applied to decorative sheet 20 should be, for example, a decoration that harmonizes with the interior of the room in which the target is to be disposed. For example, if the target is a table, display device 100 should be embedded in table body 70, and when the table is viewed while display 10 is not displaying a video, the decoration should make display device 100 appear to be on the table. In this embodiment, since the target is a wood tone table, decorative sheet 20 is decorated with the same wood tone. It is to be noted that the decoration of decorative sheet 20 is not limited to wood tone. The decoration may be, for example, white luster tone, stainless steel tone, or something else.

Decorative sheet 20 is arranged on the frontmost surface of display device 100, for example. When display device 100 is embedded in the target, the user visually recognizes decorative sheet 20. It is excellent that decorative sheet 20 is not seen through in a state in which display 10 does not display the video, and that display 10 is not visually recognized.

Decorative sheet 20 may include the portion corresponding to first illuminance sensor 41 and the portion corresponding to second illuminance sensor 42 which have an identical configuration in the front view. The decorative sheet 20 portion corresponding to first illuminance sensor 41 indicates, for example, the decorative sheet 20 portion through which ambient light enters first illuminance sensor 41. Likewise, the decorative sheet 20 portion corresponding to second illuminance sensor 42 indicates, for example, the decorative sheet 20 portion through which ambient light enters second illuminance sensor 42. The two portions are different portions in the front view, but may partly overlap with each other instead. It is to be noted that the configuration of decorative sheet 20 includes, for example, at least one of the layer configuration of decorative sheet 20, a decoration material (paint, etc.,) configuration of decorative sheet 20, and the like.

In addition, decorative sheet 20 may include the portion corresponding to first illuminance sensor 41 and the portion corresponding to second illuminance sensor 42 in the front view which have the same property to light. The property to light (optical property) is a transmittance or a reflectivity.

Alternatively, decorative sheet 20 may be a decorative sheet in which one of the configuration or the property to light of the portion corresponding to first illuminance sensor 41 and the corresponding one of the configuration or the property to light of the portion corresponding to second illuminance sensor 42 in the front view are the same. The decorative sheet 20 portion corresponding to display 10 is the decorative sheet 20 portion which overlaps with display 10 in the front view.

It is to be noted that at least one of the configuration or the property to light may be the same in the entirety of decorative sheet 20 in the front view.

Transparent plate 30 is a plate-shaped member arranged between display 10 and decorative sheet 20. Display device 100 includes transparent plate 30, and thus is capable of effectively protecting display 10 compared to the case of including a film instead of transparent plate 30, and capable of keeping decorative sheet 20 flat. By keeping decorative sheet 20 flat, an advantage of an improved appearance of the design can be expected. In addition, since display device 100 includes transparent plate 30, it is possible to place objects such as tableware 90a to 90c on decorative sheet 20 as illustrated in FIGS. 1A and 1B.

Transparent plate 30 is made of light-transmissive material, for example, a resin or glass. Transparent plate 30 may be made of, for example, cured resin or strengthened glass. The strengthened glass is, for example, a glass plate whose surface has undergone a chemical strengthening treatment process to have a compressive stress layer. In addition, for example, when an electrical device is disposed in space 80, transparent plate 30 may be made of a material that does not shield electromagnetic waves, etc., that are emitted from the electrical device.

It is excellent that transmittance of transparent plate 30 is high. For example, the transmittance of transparent plate 30 is, but not limited to, greater than or equal to 80%. In addition, transparent plate 30 is the same in size as decorative sheet 20 in the front view as a non-limiting example.

By means of the outer periphery of transparent plate 30 being supported by table body 70, for example, display device 100 is fixed to table body 70. It is to be noted that transparent plate 30 may be fixed to table body 70 attachably or detachably. It is to be noted that transparent plate 30 is not an essential element.

First illuminance sensor 41 and second illuminance sensor 42 each detect an illuminance of ambient light around display device 100 disposed. In this embodiment, first illuminance sensor 41 and second illuminance sensor 42 are arranged at the display 10 side of decorative sheet 20. Stated differently, first illuminance sensor 41 and second illuminance sensor 42 are housed in recess 70a of table body 70. First illuminance sensor 41 and second illuminance sensor 42 can be said to be embedded in display device 100.

In this way, first illuminance sensor 41 and second illuminance sensor 42 are capable of detecting an illuminance of ambient light that has passed through decorative sheet 20. It is to be noted that first illuminance sensor 41 and second illuminance sensor 42 may be arranged outside of display device 100. This makes first illuminance sensor 41 and second illuminance sensor 42 arranged less visible to the user.

First illuminance sensor 41 and second illuminance sensor 42 are arranged at mutually different positions at which they overlap with decorative sheet 20 in the front view. First illuminance sensor 41 and second illuminance sensor 42 may be arranged, for example, to sandwich display 10 in the front view. Alternatively, first illuminance sensor 41 and second illuminance sensor 42 may be arranged at positions closer the outer periphery of decorative sheet 20. Alternatively, first illuminance sensor 41 and second illuminance sensor 42 may be arranged, for example, either at both the end portions in the lengthwise direction of decorative sheet 20 that is rectangular (the y-axis positive side end portion and the y-axis negative side end portion) or at both the end portions in the transverse direction of decorative sheet 20 that is rectangular (the x-axis positive side end portion and the x-axis negative side end portion). Alternatively, when one or more chairs are arranged around a table, first illuminance sensor 41 and second illuminance sensor 42 may be arranged at positions distant from the chairs arranged. Alternatively, first illuminance sensor 41 and second illuminance sensor 42 may be arranged in second region R2 among first region R1 and second region R2. First illuminance sensor 41 and second illuminance sensor 42 may be arranged, for example, at positions which are not visually recognized by the user.

Alternatively, first illuminance sensor 41 and second illuminance sensor 42 may be arranged, for example, at positions closer to display 10 (for example, around display 10). It is to be noted that first illuminance sensor 41 and second illuminance sensor 42 are not arranged at positions at which video light that is emitted by display 10 enters such as positions which overlap with display 10 in the front view.

For example, first illuminance sensor 41 and second illuminance sensor 42 are fixed to table body 70. In this way, for example, even when decorative sheet 20 and transparent plate 30 are exchanged, it is possible to use first illuminance sensor 41 and second illuminance sensor 42 as they are.

In this embodiment, first illuminance sensor 41 and second illuminance sensor 42 make up an illuminance sensor unit. The illuminance sensor unit is one example of an obtainer which obtains illuminance. It is to be noted that the number of illuminance sensors included in the illuminance sensor unit is not particularly limited as long as the number is 1 or greater. In addition, the illuminance sensor unit (for example, first illuminance sensor 41 and second illuminance sensor 42) is not an essential element.

Controller 50 controls each of constituent elements of display device 100. In order to inhibit display 10 from being visually recognized by the user, controller 50 controls a luminance of video to be displayed by display 10 according to an illuminance. Controller 50 inhibits display 10 from being visually recognized by the user by inhibiting occurrence of black level degradation to be described later. Controller 50 controls the luminance of the video to be displayed by display 10, based on the illuminance of ambient light around display device 100 disposed and first information indicating a relationship between (i) the illuminance and (ii) the appearances of black display of the video and space 80 on decorative sheet 20. Controller 50 can be said to correct the luminance indicated by a video signal, based on the illuminance of the ambient light around display device 100. The first information can be said to indicate the illuminance of the ambient light around display device 100 disposed and the relationship between (i) the illuminance and (ii) the appearances of the third region and second region R2 on decorative sheet 20.

It is to be noted that controlling the luminance of the video means, for example, changing the luminances of the bright display and the black display while maintaining the contrast ratio of the video to be displayed by display 10. Here, it can be said that the appearance of the black display of the video on decorative sheet 20 is appearance of the video to be displayed by display 10 seen through decorative sheet 20, and that the appearance of space 80 on decorative sheet 20 is appearance of space 80 seen through decorative sheet 20.

In this way, controller 50 corrects the luminance according to the illuminance when display 10 is displaying the video so as to inhibit display 10 from being visually recognized by the user. For example, controller 50 may control the luminance of the video to be displayed by display 10 by correcting the luminance of the backlight of display 10 according to the illuminance, or may control the luminance of the video to be displayed by display 10 by correcting the optical property of a display panel of display 10. For example, controller 50 may correct a transmittance when the display panel is a liquid crystal panel, and correct the luminance (light emission luminance) when the display panel is an organic EL panel.

In addition, controller 50 causes first illuminance sensor 41 and second illuminance sensor 42 to detect illuminance. For example, controller 50 causes first illuminance sensor 41 and second illuminance sensor 42 to detect illuminance at the same timing. In other words, controller 50 controls the luminance of the video using the illuminance detected at the same timing by first illuminance sensor 41 and second illuminance sensor 42. However, control by controller 50 is not limited thereto.

It is to be noted that, when display device 100 does not include any illuminance sensor unit, controller 50 obtains illuminance from an external illuminance sensor unit when a video is displayed. When controller 50 obtains an illuminance from the external illuminance sensor unit, controller 50 may calculate the illuminance of ambient light after passing through decorative sheet 20 from the obtained illuminances, based on the optical property of decorative sheet 20, and control the luminance of the video using the calculated illuminance. The optical property of decorative sheet 20 is a transmittance or a reflectivity of decorative sheet 20 as a non-limiting example. For example, controller 50 may calculate an illuminance of ambient light after passing through decorative sheet 20, using a first lookup table (first LUT) in which an illuminance that is detected by the external illuminance sensor unit and the illuminance of ambient light after passing through decorative sheet 20 are associated with each other.

Figure 5:
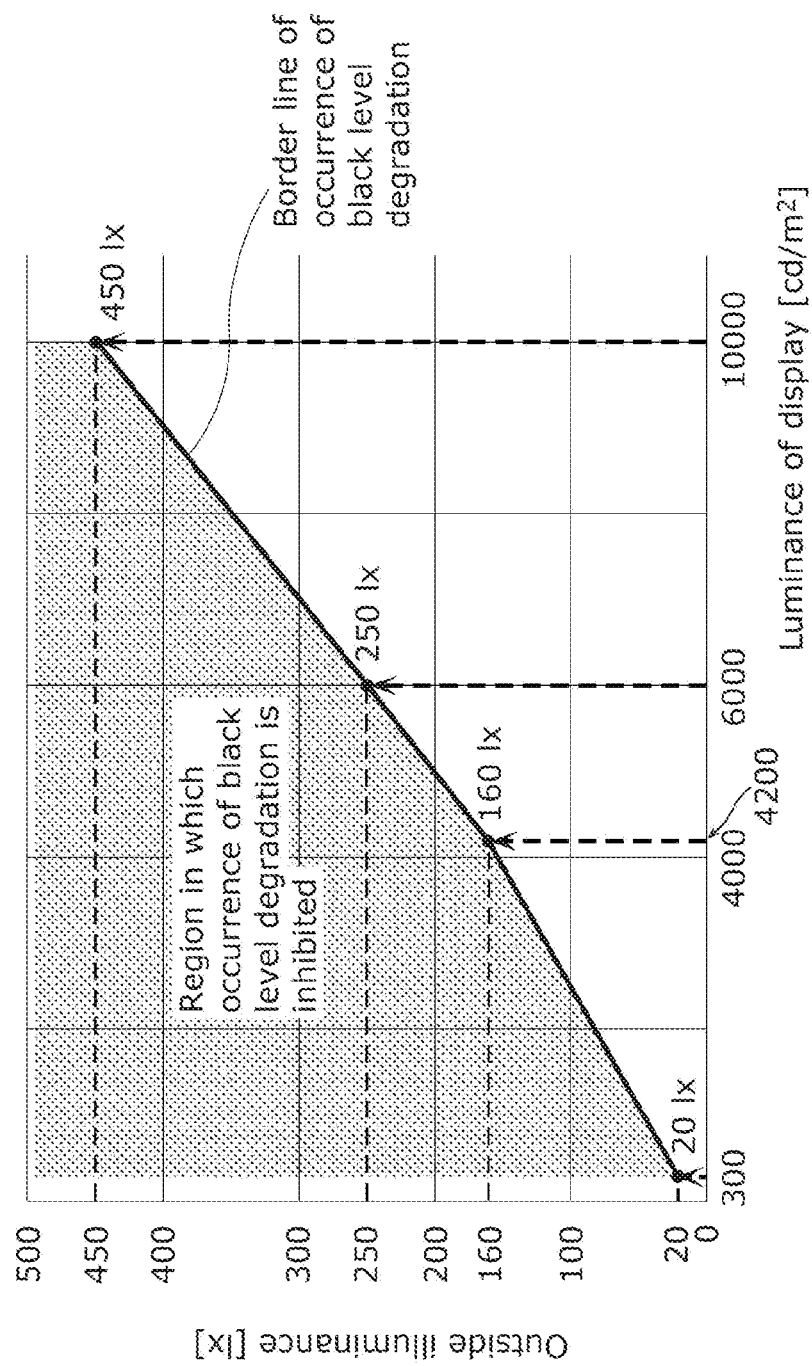
FIG. 5 is a diagram for illustrating how occurrence of black level degradation is inhibited according to the embodiment.

Here, the first information that controller 50 uses to correct the luminance is described with reference to FIG. 5. FIG. 5 is a diagram for illustrating how occurrence of black level degradation is inhibited according to the embodiment. It is to be noted that black level degradation here is a state in which the black level on decorative sheet 20 in a region in which display 10 is performing black display changes to a white level side, and the original black becomes closer to gray. Such black level degradation may occur when ambient light that passed through decorative sheet 20 enters display screen 10a, and the incident light is reflected on display screen 10a.

The black level degradation when occurred makes a difference between a first black level on decorative sheet 20 in the region in which display 10 is performing black display and a second black level on decorative sheet 20 in space 80 around display 10. Specifically, the first black level becomes brighter than the second black level. With the difference, the wood tone on decorative sheet 20 looks differently from region to region (for example, between the third region and second region R2). In this way, occurrence of black level degradation makes display 10 disposed visible to the user. For this reason, it is possible to make display 10 disposed less visible to the user by inhibiting occurrence of black level degradation.

In FIG. 5, the vertical axis indicates illuminances (outside light illuminances) detected by the illuminance sensor unit and the horizontal axis indicates luminances (luminances of display 10) of a video that is displayed by display 10. Although a luminance of a video indicates a luminance on display screen 10a in the portion (pixel region) in which bright display is being performed, it is to be noted that a luminance of a video may indicate a luminance on display screen 10a in the portion in which black display is being performed. The relationship between an illuminance and a luminance of display 10 is the same regardless of whether the luminance of the video is a luminance in bright display or a luminance in black display. In addition, when the contrast ratio in the video is already known, the luminance in black display can be calculated from the luminance in bright display based on the contrast ratio. In addition, the illuminance indicates the illuminance of ambient light which transmitted decorative sheet 20. It is to be noted that the border line of occurrence of black level degradation indicated in FIG. 5 indicates the border between the region in which occurrence of black level degradation is inhibited and the region in which occurrence of black level degradation is not inhibited. For example, the border is set based on numerical values obtained though subjective evaluation such as visual observation.

As illustrated in FIG. 5, it is known that the illuminance that inhibits occurrence of black level degradation becomes higher as the luminance of display 10 becomes higher. In other words, it is known that the luminance of display 10 that inhibits occurrence of black level degradation becomes higher as the illuminance becomes higher. For example, controller 50 controls display 10: so that the luminance of the video is less than or equal to 4200 cd/m² when a current illuminance is 160 lx; so that the luminance of the video is less than or equal to 6000 cd/m² when a current illuminance is 250 lx; and so that the luminance of the video is less than or equal to 10000 cd/m² when a current illuminance is 450 lx. In addition, controller 50 controls display 10 so that the luminance of the video is 300 cd/m² when a current illuminance is 20 lx.

In this way, the border line of the occurrence of black level degradation indicated in FIG. 5 can be said to indicate the upper-limit value of luminance (upper-limit luminance) of the video that can inhibit occurrence of black level degradation relative to the illuminance of ambient light. Inhibition of occurrence of black level degradation is one example of obtainment of a desired visibility. Although the upper-limit luminance indicated in FIG. 5 indicates a luminance in bright display, it is to be noted that the upper-limit luminance may be a luminance in black display.

In addition, controller 50 may control display 10 so that the luminance of the video is more than or equal to 300 cd/m² and less than or equal to 4200 cd/m² when a current illuminance is 160 lx. The lower-limit value (for example, 300 cd/m²) of luminance of a video is, for example, a luminance of display 10 corresponding to the lower-limit illuminance in an illuminance range that requires adjustment of luminance of display 10. The illuminance range is set in advance, and is for example 20 lx or more as a non-limiting example.

Information based on the border line of occurrence of black level degradation is stored in storage 60. The information based on the border line of occurrence of black level degradation may be (i) a function that enables, based on an illuminance, calculation of a luminance of a video or a correction value for the luminance of the video, or (ii) a second LUT in which the illuminance and either the luminance of the video or the correction value for the luminance of the video are associated with each other. The information based on the border line of occurrence of black level degradation is one example of the first information.

It is to be noted that the relationship between the illuminance and the luminance of display 10 that inhibits occurrence of black level degradation indicated in FIG. 5 changes, for example, according to an optical property (for example, a contrast ratio, or the like) of display 10 or an optical property (for example, a transmittance) of decorative sheet 20. For this reason, it is excellent that the relationship between the illuminance and luminance of display 10 that inhibits occurrence of black level degradation indicated in FIG. 5 is obtained for each display 10 or decorative sheet 20. The relationship is obtained before display device 100 is used.

Storage 60 stores various kinds of programs for allowing controller 50 to perform various kinds of control in display device 100. In addition, storage 60 stores the first information (for example, the second LUT), the first LUT, etc. Storage 60 is implemented by a semiconductor memory as a non-limiting example.

Table body 70 is a body of the table, and the part other than display device 100. Table body 70 houses, in recess 70a, at least display 10. In addition, table body 70 supports display device 100. It is to be noted that table body 70 should be stably disposed on the ground or the like, and the shape and material thereof are not particularly limited.

[2. Operation by Display Device]

Figure 6:
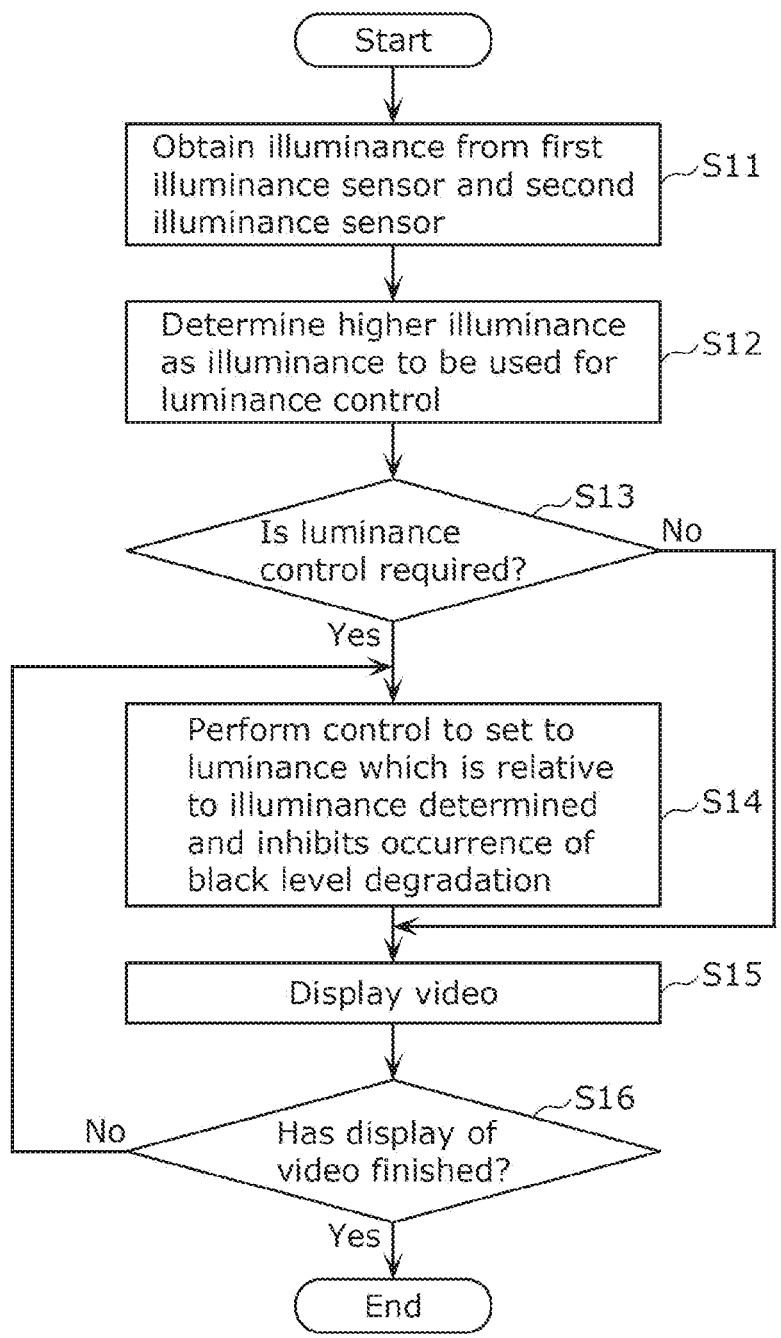
FIG. 6 is a flow chart indicating operations by the display device according to the embodiment.
Figure 7:
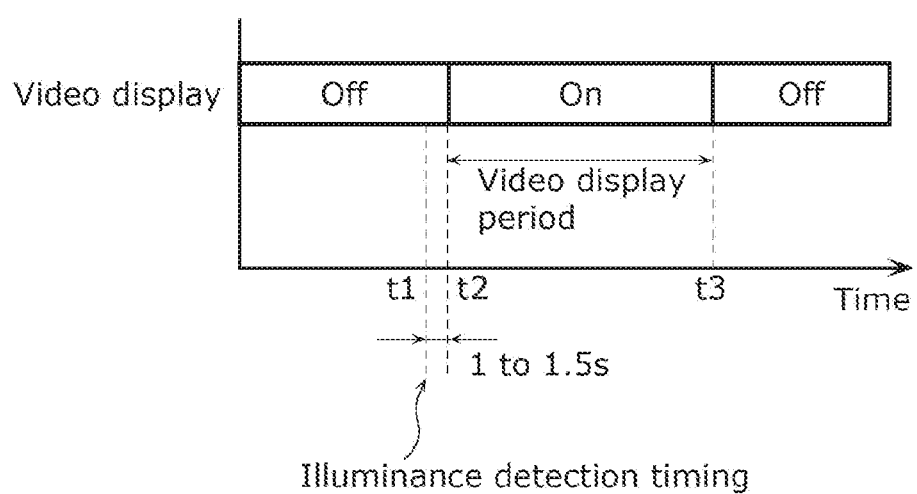
FIG. 7 is a diagram for illustrating illuminance detection timings according to the embodiment.

Next, operations that are performed by display device 100 is described with reference to FIGS. 6 and 7. FIG. 6 is a flow chart indicating the operations by display device 100 according to the embodiment. FIG. 7 is a diagram for illustrating illuminance detection timings according to the embodiment.

As indicated in FIG. 6, controller 50 obtains illuminances from first illuminance sensor 41 and second illuminance sensor 42 (S11). For example, when obtaining a video signal for displaying a video, controller 50 causes first illuminance sensor 41 and second illuminance sensor 42 to detect the illuminances, so as to obtain the illuminances detected at the same timing. Controller 50 causes first illuminance sensor 41 and second illuminance sensor 42 to detect, for example, illuminances at a timing immediately before a video is displayed on display screen 10a.

As illustrated in FIG. 7, controller 50 causes first illuminance sensor 41 and second illuminance sensor 42 to detect the illuminances before the video display period (period from time t2 to time t3). Controller 50 causes first illuminance sensor 41 and second illuminance sensor 42 to detect the illuminances, for example at time t1 that is before time t2. Time t1 corresponds to an illuminance detection timing at which illuminances are detected, and is before time t2 by 1 second or more and 1.5 second or less, as a non-limiting example. Time t1 may be appropriately determined according to period required for video luminance control (for example, adjustment) by controller 50.

It is only necessary for controller 50 to detect an illuminance once in one video display. In other words, controller 50 does not always detect illuminances during the video display period. Controller 50 may stop detection of illuminances during the video display period. In this way, controller 50 is capable of preventing strange video whose luminance changes due to change in illuminance in the video display period. In addition, controller 50 is capable of reducing electric power that is consumed by first illuminance sensor 41 and second illuminance sensor 42.

With reference to FIG. 6 again, controller 50 next determines, as the illuminance to be used for luminance control (for example, luminance adjustment) of the video, the higher one of the illuminance detected by first illuminance sensor 41 and the illuminance detected by second illuminance sensor 42 (S12). For example, controller 50 determines only the higher one of the two illuminances as the illuminance to be used for the luminance control of the video.

Although no object is placed on first illuminance sensor 41 in the example of FIGS. 1A and 1B, mobile terminal 90e is placed on second illuminance sensor 42. In this case, the illuminance that is detected by first illuminance sensor 41 becomes higher than the other, controller 50 determines the illuminance detected by first illuminance sensor 41 as the illuminance to be used for the luminance control of the video. In this way, it is possible to determine the illuminance which can inhibit occurrence of black level degradation even when the object is placed on the illuminance sensor.

Next, controller 50 determines whether luminance control is required, based on the illuminance determined (S13). For example, when information indicating a border line of occurrence of black level degradation (one example of the first information) illustrated in FIG. 5 is stored, controller 50 makes the determination in Step S13 using the information. For example, when the determined illuminance is 250 lx, controller 50: determines that luminance control is required when the luminance of the video based on a video signal is higher than 6000 cd/m²; and determines that no luminance control is required when the luminance of the video based on a video signal is 6000 cd/m² or below.

Next, when determining that luminance control is required (Yes in S13), controller 50 performs control to set the luminance based on the video signal to a luminance which is relative to the illuminance determined in Step S12 and inhibits occurrence of black level degradation (S14). For example, when the determined illuminance is 250 lx, controller 50 adjusts the luminance of the video to 6000 cd/m² or below. In addition, when determining that no luminance control is required (No in S13), controller 50 proceeds to Step S15 without performing control of the luminance based on the video signal. It is to be noted that display 10 does not display the video when the operations in Steps S11 to S14 are executed. Stated differently, the operations up to Step S14 are executed before time 2 in FIG. 5.

When the luminance of the video is determined, controller 50 next causes display 10 to display the video according to the luminance determined (S15). For example, controller 50 changes at least one of the luminance of the backlight or the optical property of the display panel, according to the adjusted luminance of the video, and causes display 10 to display the video having the adjusted luminance.

Next, controller 50 determines whether the display of the video has finished (S16). For example, controller 50 makes the determination in Step S16 based on whether the video is displayed in a predetermined period (for example, the video display period illustrated in FIG. 7).

Next, controller 50 finishes the processing when the display of the video has finished (Yes in S16), or proceeds to Step S14 and continues the display of the video when the display of the video has not finished (No in S16). Here, no new illuminance detection is performed. Controller 50 controls the luminance of the video to be displayed after the determination of No is made in Step S16, based on the illuminance detected before (for example, time t1) the display of the video. Stated differently, when the determination in Step 16 is No, controller 50 executes the operation in Step S14 based on the illuminance determined in Step S12 for example. In this way, the luminance of the video displayed during the video display period is controlled based on the one illuminance.

[3. Advantageous Effects, Etc.]

As described above, display device 100 includes: display 10 which includes display screen 10a on which a video is displayed; decorative sheet 20 which is disposed on display screen 10a side of display 10, is larger than display screen 10a in a front view of display screen 10a, and covers display screen 10a, decorative sheet 20 including first region R1 which overlaps with display screen 10a in the front view and second region R1 which does not overlap with display screen 10a in the front view; and controller 50 which controls a luminance of the video that is displayed by display 10, based on (i) an illuminance of ambient light around display 10 and decorative sheet 20 and (ii) first information indicating a relationship between the illuminance and appearances of a third region and second region R2 on decorative sheet 20, the third region corresponding to a black display region of the video in first region R1.

In this way, display device 100 is capable of controlling the luminance of the video based on the first information, and thus is capable of performing control to set the luminance in the black display region of the video to the luminance according to the appearances of the third region and second region R2 on decorative sheet 20. Thus, it is possible to further inhibit display 10 from being visually recognized by the user due to the difference in appearance of the third region and second region R2.

In addition, the first information includes an upper-limit luminance of the video. The upper-limit luminance is relative to the illuminance of the ambient light and inhibiting occurrence of black level degradation in the black display region on decorative sheet 20. Controller 50 then controls the luminance of the video so that the luminance of the video is less than or equal to the upper-limit luminance which is relative to the illuminance.

In this way, display device 100 is capable of performing control to set the luminance of the video to the luminance that can inhibit occurrence of black level degradation, and thus is capable of inhibiting display 10 from being visually recognized by the user due to occurrence of black level degradation.

In addition, display device 100 further include an illuminance sensor unit which is disposed on the display 10 side of decorative sheet 20 and detects the illuminance of the ambient light that has passed through decorative sheet 20.

In this way, display device 100 is capable of obtaining the luminance on which the optical property of decorative sheet 20 has been reflected. The use of the illuminance makes it possible to perform control to set the luminance of the video to the luminance also according to the optical property of decorative sheet 20. Thus, display device 100 is capable of further inhibiting display 10 from being visually recognized by the user due to occurrence of black level degradation.

In addition, display device 100 does not need to perform dedicated processing for reflecting the optical property of decorative sheet 20 onto the luminance of the video, and thus is capable of inhibiting increase in the amount of processing by controller 50. This leads to inhibiting increase in the electric power to be consumed by controller 50.

In addition, for example, tableware 90a to 90c (for example, dishes), electronic device 90d, mobile terminal 90e, etc., may be placed on decorative sheet 20, as illustrated in FIGS. 1A and 1B. Furthermore, it is conceivable that a body part (for example, an elbow) of the user blocks ambient light on any of the illuminance sensors. Even in such a circumstance, display device 100 may be desired to obtain ambient light correctly. In view of this, the illuminance sensor unit of display device 100 may include first illuminance sensor 41 and second illuminance sensor 42 arranged at mutually different positions. Controller 50 may then control the luminance of the video using a higher one of an illuminance obtained from first illuminance sensor 41 and an illuminance obtained from second illuminance sensor 42.

In this way, display device 100 is capable of controlling the luminance of the video, using the illuminance detected by one of the two illuminance sensors on which the object is not placed when the object that blocks ambient light is placed on the other one of the illuminance sensors. Stated differently, display device 100 can obtain ambient light correctly, even when part of ambient light that enters display device 100 is blocked. Thus, display device 100 is capable of inhibiting occurrence of black level degradation even when the object that blocks ambient light is placed on the illuminance sensor.

In addition, decorative sheet 20 includes a portion corresponding to first illuminance sensor 41 and a portion corresponding to second illuminance sensor 42 that are structurally identical to each other in the front view.

In this way, display device 100 is capable of inhibiting occurrence of difference between the illuminance detected by first illuminance sensor 41 and the illuminance detected by second illuminance sensor 42 due to the difference in configuration between portions of decorative sheet 20. Stated differently, display device 100 is capable of controlling the luminance of the video more precisely, compared to the case where the illuminances to be detected are different due to the difference in configuration between portions of decorative sheet 20. Thus, display device 100 is capable of further inhibiting display 10 from being visually recognized by the user because occurrence of black level degradation is further inhibited.

In addition, decorative sheet 20 includes a portion corresponding to first illuminance sensor 41 and a portion corresponding to second illuminance sensor 42 that have a same property to light.

In this way, display device 100 is capable of inhibiting occurrence of difference between the illuminance detected by first illuminance sensor 41 and the illuminance detected by second illuminance sensor 42 due to the difference in property to light (for example, transmittance) between portions of decorative sheet 20. Stated differently, display device 100 is capable of controlling the luminance of the video more precisely, compared to the case where the illuminances to be detected are different due to the difference in property to light between portions of decorative sheet 20. Thus, display device 100 is capable of further inhibiting display 10 from being visually recognized by the user because occurrence of black level degradation is further inhibited.

In addition, controller 50 may obtain the illuminance from an illuminance sensor unit which is provided outside of display device 100, calculate an illuminance of the ambient light after passing though decorative sheet 20 from the illuminance obtained, based on an optical property of decorative sheet 20, and control the luminance of the video using the illuminance calculated.

In this way, it is possible to simplify the configuration of display device 100. In addition, controller 50 calculates the illuminance of ambient light after passing through decorative sheet 20 based on the illuminance detected by the external illuminance sensor unit, and thus is capable of obtaining the illuminance on which the optical property (for example, transmittance) of decorative sheet 20 has been reflected. Thus, display device 100 is capable of inhibiting reduction in precision in luminance control of the video when the illuminance is obtained from outside.

In addition, the illuminance sensor unit detects the illuminance immediately before the video is displayed on display screen 10a. Controller 50 then controls the luminance of the video in a period in which the video is displayed, using the illuminance before the video is displayed.

In this way, display device 100 is capable of inhibiting change in luminance of the video due to change in illuminance detected in the period in which the video is displayed. Thus, it is possible to inhibit display 10 from being visually recognized by the user due to change in luminance of the video during the period in which the video is displayed.

In addition, display 10 is configured to include a liquid crystal display.

With this, display device 100 is capable of efficiently inhibiting occurrence of black level degradation by controlling the luminance (for example, luminance of black display) of the video according to the illuminance when including the liquid crystal display which has difficulty in displaying in complete black (for example, black having a luminance of 0 cd/m$^2$).

In addition, space 80 is formed around display 10 in a front view, and second region R2 is a region which covers space 80 in the front view.

In this way, even when display device 100 is disposed so that space 80 is formed around display 10, it is possible to inhibit display 10 from being visually recognized by the user.

Furthermore, as described above, a control method according to this embodiment is a method of controlling display device 100 including: display 10 which includes display screen 10a on which a video is displayed; decorative sheet 20 which is disposed on a display screen 10a side of display 10, is larger than display screen 10a in a front view of display screen 10a, and covers display screen 10a, decorative sheet 20 including first region R1 which overlaps with display screen 10a in the front view and second region R2 which does not overlap with display screen 10a in the front view. The method includes: controlling a luminance of the video that is displayed by display 10, based on (i) an illuminance of ambient light around display device 100 and (ii) information indicating a relationship between the illuminance and appearances of a third region and second region R2 on the decorative sheet, the third region corresponding to a black display region of the video in first region R1.

In this way, the method provides effects similar to those provided by display device 100.

Variation 1 of the Embodiment

Figure 8:
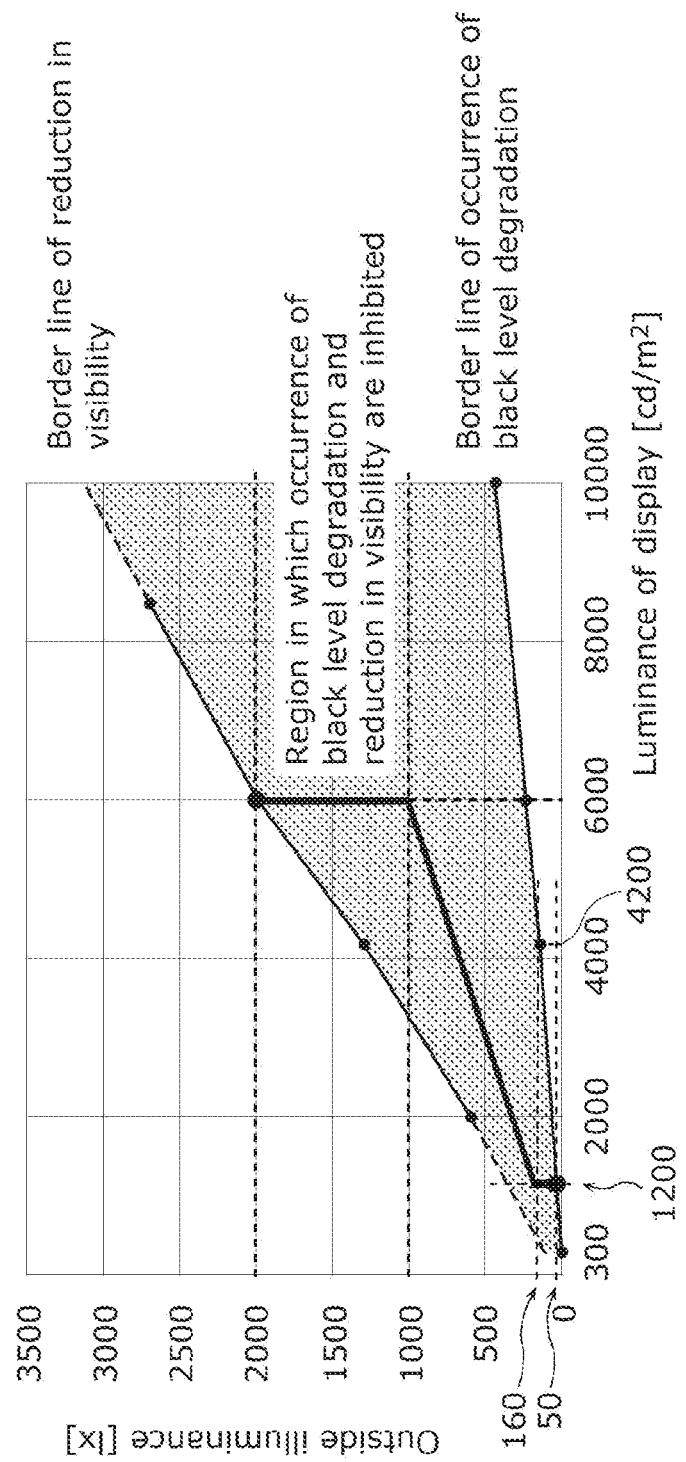
FIG. 8 is a diagram for illustrating how occurrence of black level degradation and reduction in visibility are inhibited according to Variation 1 of the embodiment.

Next, a display device according to a variation is described with reference to FIGS. 8 and 9. The display device according to this variation has a function for inhibiting reduction in visibility of a video, in addition to inhibition of occurrence of black level degradation. FIG. 8 is a diagram for illustrating how occurrence of black level degradation and reduction in visibility are inhibited according to this variation. In FIG. 8, the vertical axis indicates illuminances (outside light illuminances) detected by the illuminance sensor unit and the horizontal axis indicates luminances (luminances of a display) of a video that is displayed by the display. Although the luminance of the video indicates the luminance of the portion in which bright display is performed, it is to be noted that the luminance of the video may be the luminance of the portion in which black display is performed.

As illustrated in FIG. 8, display device 100 according to this variation is different from the one in the embodiment in that a border line of reduction in visibility is set in advance in display device 100. The border line of reduction in visibility indicates the relationship between the illuminance and visibility of a video, and indicates, for example, the border as to whether the visibility reduces. The reduction in visibility indicates that the contrast ratio of the video becomes lower than a desired contrast ratio, and may indicate, for example, that display quality is below a desired quality when subjective evaluation is made by visual inspection, or the like. It is to be noted that the elements of the display device according to this variation is similar to those of the display device according to the embodiment, the following description is given of using the reference signs of the respective elements used in the embodiment. In addition, the descriptions of the elements of the display device are omitted for simplified.

As illustrated in FIG. 8, it is known that the illuminance at which the visibility reduces becomes higher as the luminance of display 10 becomes higher. In other words, it is known that the luminance of display 10 at which the visibility reduces also becomes higher as the illuminance becomes higher. For example, controller 50 may control display 10 so that the luminance of a video is more than or equal to 300 cd/m$^2$ and less than or equal to 4200 cd/m$^2$ when a current illuminance is 160 lx. In this way, the border line of reduction in visibility illustrated in FIG. 8 can be said to indicate the lower-limit value (lower-limit luminance) of the luminance of the video which can inhibit reduction in visibility relative to the illuminance of ambient light. Inhibition of reduction in visibility is one example of obtainment of a desired visibility.

In this way, in this variation, controller 50 further controls the luminance of the video based also on information regarding the border line of reduction in visibility.

It is to be noted that the luminance range of the video that is controllable by controller 50 may be set in advance. The luminance range of the video may be set, for example, based on the possible illuminance range of ambient light in the space in which display device 100 is disposed. FIG. 8 illustrates an example in which the luminance range is set to the range from 1200 cd/m$^2$ to 6000 cd/m$^2$ when the possible illuminance rage of ambient light is the range from 50 lx to 2000 lx. Stated differently, controller 50 controls the luminance of the video according to the illuminance in the luminance range from 1200 cd/m$^2$ to 6000 cd/m$^2$. In this way, the illuminance range of the possible ambient light is obtained in advance, which makes it possible to, for example, prepare display 10 including a backlight having the luminance range according to the illuminance range. It is to be noted that the luminance of 1200 cd/m$^2$ is the luminance corresponding to an illuminance of 50 lx in the border line of occurrence of black level degradation, and the luminance of 6000 cd/m$^2$ is the luminance corresponding to a illuminance of 2000 lx in the border line of reduction in visibility.

Controller 50 controls luminances of the video to 1200 cd/m$^2$ collectively with respect to the illuminance range from 50 lx to 160 Ix; controls luminances of the video in the range from 1200 cd/m$^2$ to 6000 cd/m$^2$ in proportion to the illuminance with respect to the illuminance range from 160 lx to 1000 lx; and controls luminances of the video to 6000 cd/m$^2$ collectively with respect to illuminances in a range from 1000 lx to 2000 lx.

Information based on the border line of reduction in visibility is stored in storage 60. The information based on the border line of reduction in visibility may be (i) a function that enables, based on an illuminance, calculation of a luminance of a video or a correction value for the luminance of the video, or (ii) a third LUT in which the illuminance and either the luminance of the video or the correction value for the luminance of the video are associated with each other. The information based on the border line of reduction in visibility is one example of the second information. The second information includes, for example, a lower-limit luminance of the video for inhibiting reduction in visibility relative to the illuminance of ambient light.

In addition, storage 60 may store information based on the border line of occurrence of black level degradation and the border line of reduction in visibility. The information may be (i) a function that enables, based on an illuminance, calculation of a luminance of a video in which occurrence of black level degradation and reduction in visibility are inhibited or a correction value for the luminance of the video, or (ii) a third LUT in which the illuminance and either the luminance of the video in which occurrence of black level degradation and reduction in visibility are inhibited or the correction value for the luminance of the video are associated with each other. The function or the third LUT are examples of the first information and the second information.

Next, an operation that is performed by display device 100 is described with reference to FIG. 9. FIG. 9 is a flow chart indicating operations by display device 100 according to this variation. Display device 100 according to this variation performs Steps S23 and S24 instead of the processing in Steps S13 and S14 performed by display device 100 according to the embodiment. Hereinafter, the processing in Steps S23 and S24 is mainly described. It is to be noted that, for example in the portions in FIG. 9 assigned with the same reference signs as in FIG. 6, processing similar to the operations indicated in FIG. 6 are performed.

Figure 9:
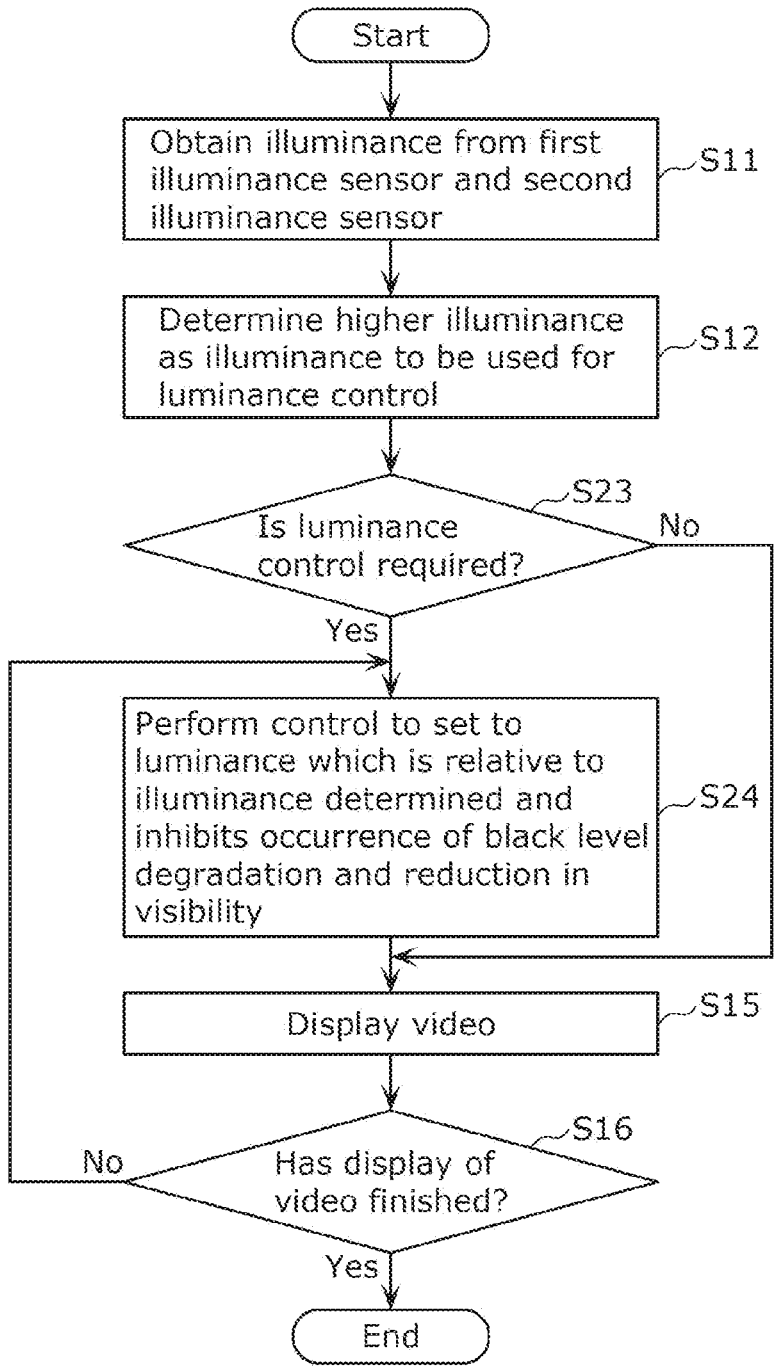
FIG. 9 is a flow chart indicating operations by the display device according to Variation 1 of the embodiment.

As indicated in FIG. 9, controller 50 determines whether luminance control (for example, luminance adjustment) is required, based on the illuminance determined in Step S12 (S23). For example, when information indicating the border line of occurrence of black level degradation (one example of the first information) and information indicating the border line of reduction in visibility (one example of the second information) are stored in storage 60, controller 50 makes the determination in Step S23 using the first information and the second information. For example, when the determined illuminance is 160 lx, controller 50: determines that luminance control is required when the luminance of the video based on a video signal is lower than 300 cd/m$^2$ or higher than 4200 cd/m$^2$; and determines that no luminance control is required when the luminance of the video based on a video signal is more than or equal to 300 cd/m$^2$ and less than or equal to 4200 cd/m$^2$.

Next, when determining that luminance control is required (Yes in S23), controller 50 performs control to set the luminance based on the video signal to a luminance which is relative to the illuminance determined in Step S12 and inhibits occurrence of black level degradation and reduction in visibility (S24). For example, when the determined illuminance is 160 lx, controller 50 adjusts the luminance of the video to a luminance that is more than or equal to 300 cd/m$^2$ and less than or equal to 4200 cd/m$^2$. Controller 50 can be said to adjust the luminance of the video so that the luminance is more than or equal to the lower-limit luminance and less than or equal to the upper-limit luminance. The lower-limit luminance and the upper-limit luminance are relative to the illuminance.

Specifically, for example, when the determined illuminance is 160 lx and the luminance of the video is 200 cd/m$^2$, controller 50 makes adjustment for increasing the luminance of the video to the luminance that is more than or equal to 300 cd/m$^2$ and less than or equal to 4200 cd/m$^2$. Specifically, for example, when the determined illuminance is 160 lx and the luminance of the video is 6000 cd/m$^2$, controller 50 makes adjustment for decreasing the luminance of the video to the luminance more than or equal to 300 cd/m$^2$ and less than or equal to 4200 cd/m$^2$.

In this way, the video displayed in Step S15 becomes the video in which occurrence of black level degradation and reduction in visibility are inhibited.

As described above, controller 50 of display device 100 according to this variation controls the luminance of the video further based on the second information indicating the relationship between the illuminance and the visibility of the video.

In this way, display device 100 controls the luminance of the video also using the second information, and thus is capable of increasing the visibility of the video, compared to the case in which the second information is not used.

In addition, the second information includes the lower-limit of the video for obtaining a desired visibility with respect to the illuminance of ambient light. Controller 50 then controls the luminance of the video so that the luminance of the video is more than or equal to the lower-limit luminance and less than or equal to the upper-limit luminance. The lower-limit luminance and the upper-limit luminance are relative to the illuminance.

In this way, display device 100 is capable of displaying the video in which both the occurrence of black level degradation and the reduction in visibility due to ambient light are inhibited.

OTHER APPLICATION EXAMPLES

Although each of the embodiment and variation describes an example in which display device 100 is used for a table, but application examples are not limited thereto. Other application examples of display device 100 are described with reference to FIGS. 10A to 12B. It is to be noted that the application examples described below are examples, and targets for which display device 100 is used are not limited thereto.

Figure 10A:
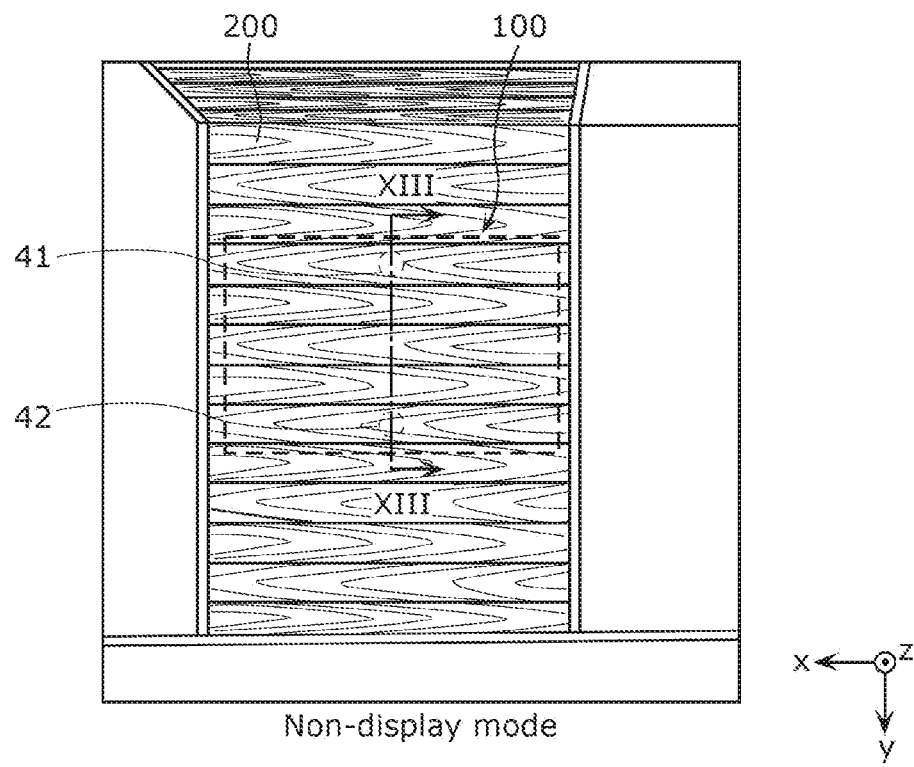
FIG. 10A is a diagram for illustrating a non-display mode in Application Example 1 of the display device according to the embodiment.
Figure 10B:
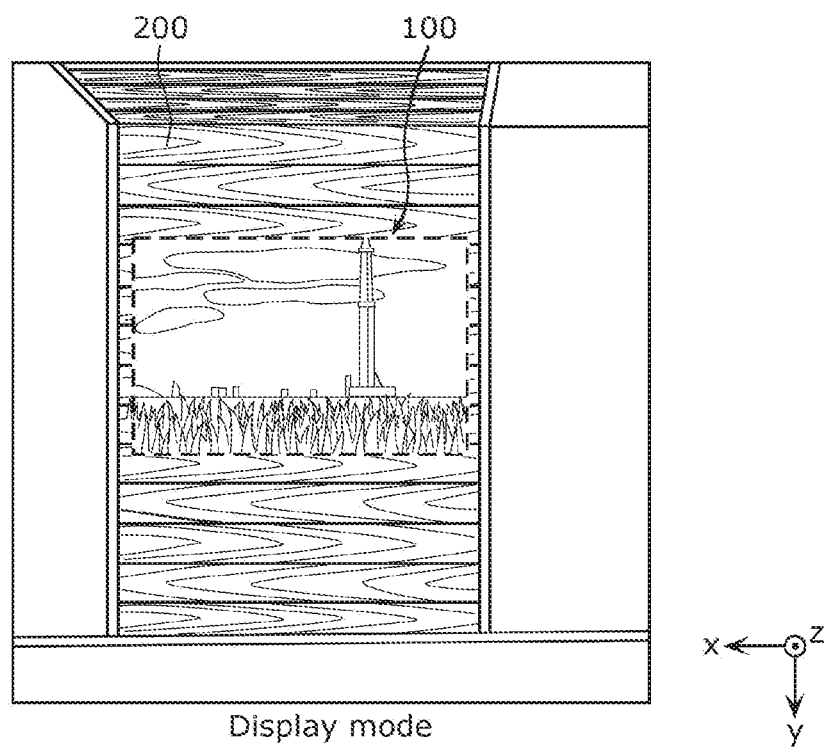
FIG. 10B is a diagram for illustrating a display mode in Application Example 1 of the display device according to the embodiment.

FIG. 10A is a diagram for illustrating a non-display mode in Application Example 1 of display device 100 according to the embodiment. FIG. 10B is a diagram for illustrating a non-display mode in Application Example 1 of display device 100 according to the embodiment.

As illustrated in FIG. 10A and FIG. 10B, display device 100 may be installed housed in a building material (for example, wall 200), which is one example of the target. In this case, the building material includes a body including a recess for storing display device 100, and display device 100 stored in the recess. In addition, display device 100 may further include first illuminance sensor 41 and second illuminance sensor 41. The recess is for embedding display device 100 into the building material. When display device 100 includes first illuminance sensor 41 and second illuminance sensor 42, first illuminance sensor 41 and second illuminance sensor 42 are further arranged in the recess.

Wall 200 has a wood tone pattern, for example. In this case, decorative sheet 20 is decorated with a wood tone. Wood tone decoration is one example of target-specific decoration. As illustrated in FIG. 10A, when controller 50 controls display 10 in the non-display mode, the user visually recognizes the wood tone decoration formed on decorative sheet 20. Stated differently, the appearance of display device 100 harmonizes with the appearance of wall 200. This makes it difficult for display device 100 to be seen embedded in wall 200. In other words, decorative sheet 20 can inhibit display device 100 from being visible.

As illustrated in FIG. 10B, when controller 50 controls display 10 in the display mode, the user can visually recognize the video displayed by display 10. For example, the user can visually recognize the video that appear to be floating on wall 200. At this time, the luminance of the video is controlled by controller 50 according to the illuminance of ambient light around wall 200. Thus, for example, occurrence of black level degradation in the video is inhibited. Accordingly, when display device 100 is attached to wall 200, display device 100 is capable of inhibiting display 10 from being visually recognized by the user even when ambient light around wall 200 changes.

Figure 11A:
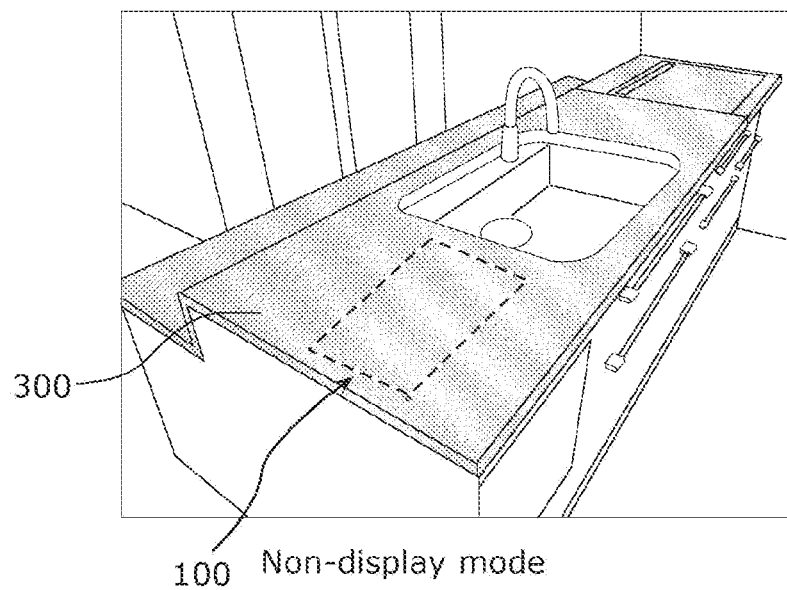
FIG. 11A is a diagram for illustrating a non-display mode in Application Example 2 of the display device according to the embodiment.
Figure 11B:
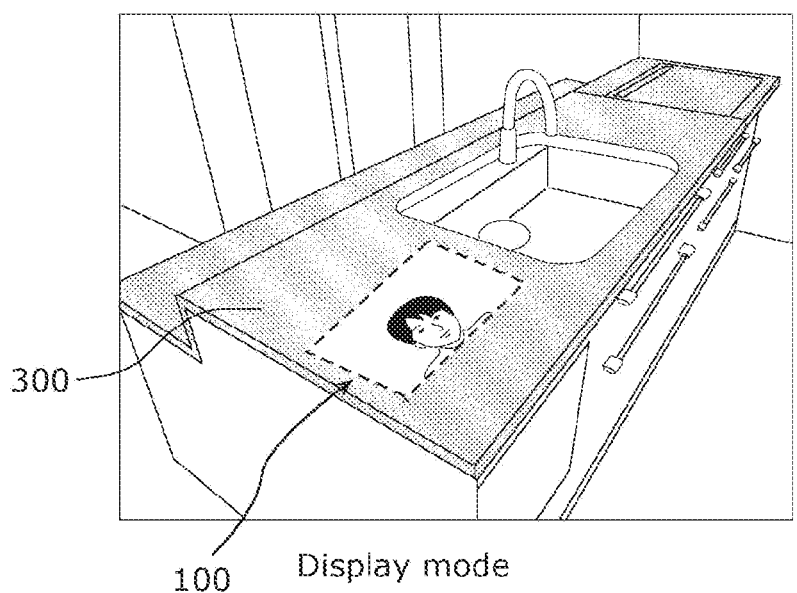
FIG. 11B is a diagram for illustrating a display mode in Application Example 2 of the display device according to the embodiment.

FIG. 11A is a diagram for illustrating a non-display mode in Application Example 2 of display device 100 according to the embodiment. FIG. 11B is a diagram for illustrating a display mode in Application Example 2 of display device 100 according to the embodiment.

As illustrated in FIG. 11A and FIG. 11B, display device 100 may be installed housed in furniture (for example, kitchen counter 300), which is one example of the target. In this case, the building material includes a body including a recess for housing display device 100, and display device 100 housed in the recess. The recess is for embedding display device 100 into the furniture.

Kitchen counter 300 has a marble tone pattern, for example. In this case, decorative sheet 20 is decorated with a marble tone. Marble tone decoration is one example of target-specific decoration. As illustrated in FIG. 11A, when controller 50 controls display 10 in the non-display mode, the user visually recognizes the marble tone decoration formed on decorative sheet 20. Stated differently, the appearance of display device 100 harmonizes with the appearance of kitchen counter 300. This makes it difficult for display device 100 to be seen embedded in kitchen counter 300.

As illustrated in FIG. 11B, when controller 50 controls display 10 in the display mode, the user can visually recognize the video displayed by display 10. The user can, for example, visually recognize the video that appear to be floating on kitchen counter 300. For example, display device 100 displays a video of, for example, a child's room so that the user can check on the child while cooking.

At this time, the luminance of the video is controlled by controller 50 according to the illuminance of ambient light around kitchen counter 300. Thus, for example, occurrence of black level degradation in the video is inhibited. Accordingly, when display device 100 is attached to kitchen counter 300, display device 100 is capable of inhibiting display 10 from being visually recognized by the user even when ambient light around kitchen counter 300 changes.

Figure 12A:
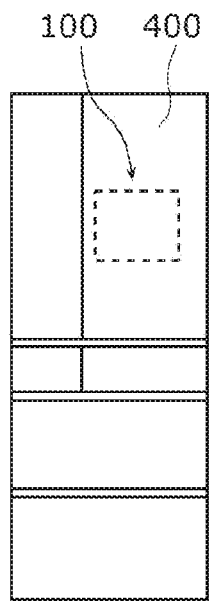
FIG. 12A is a diagram for illustrating a non-display mode in Application Example 3 of the display device according to the embodiment.
Figure 12B:
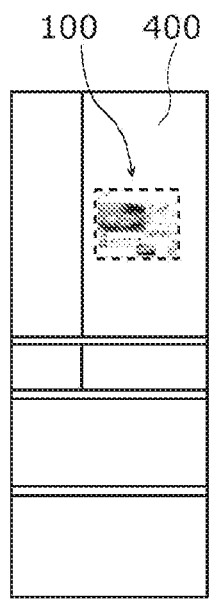
FIG. 12B is a diagram for illustrating a display mode in Application Example 3 of the display device according to the embodiment.

FIG. 12A is a diagram for illustrating a non-display mode in Application Example 3 of display device 100 according to the embodiment. FIG. 12B is a diagram for illustrating a display mode in Application Example 3 of display device 100 according to the embodiment.

As illustrated in FIG. 12A and FIG. 12B, display device 100 may be installed housed in electrical device (for example, a household electrical device such as refrigerator 400), which is one example of the target. In this case, the electrical device includes a body including a recess for housing display device 100, and display device 100 housed in the recess. The recess is for embedding display device 100 into the electrical device.

For example, refrigerator 400 has a monochromatic color tone (for example, white). In this case, decorative sheet 20 is decorated with a white color tone. White color tone decoration is one example of target-specific decoration. As illustrated in FIG. 12A, when controller 50 controls display 10 in the non-display mode, the user visually recognizes the white color tone decoration formed on decorative sheet 20. Stated differently, the appearance of display device 100 harmonizes with the appearance of refrigerator 400. This makes it difficult for display device 100 to be seen embedded in refrigerator 400. It is to be noted that, in the present application, a single color tone may be included in a pattern.

As illustrated in FIG. 12B, when controller 50 controls display 10 in the display mode, the user can visually recognize the video displayed by display 10. For example, the user can visually recognize the video that appears to be floating on refrigerator 400. For example, a cooking method or cooking ingredients can be displayed by display device 100, allowing the user to cook efficiently.

At this time, the luminance of the video is controlled by controller 50 according to the illuminance of ambient light around refrigerator 400. Thus, for example, occurrence of black level degradation in the video is inhibited. Accordingly, when display device 100 is attached to refrigerator 400, display device 100 is capable of inhibiting display 10 from being visually recognized by the user even when ambient light around refrigerator 400 changes.

Variation 2 of the Embodiment

Figure 13:
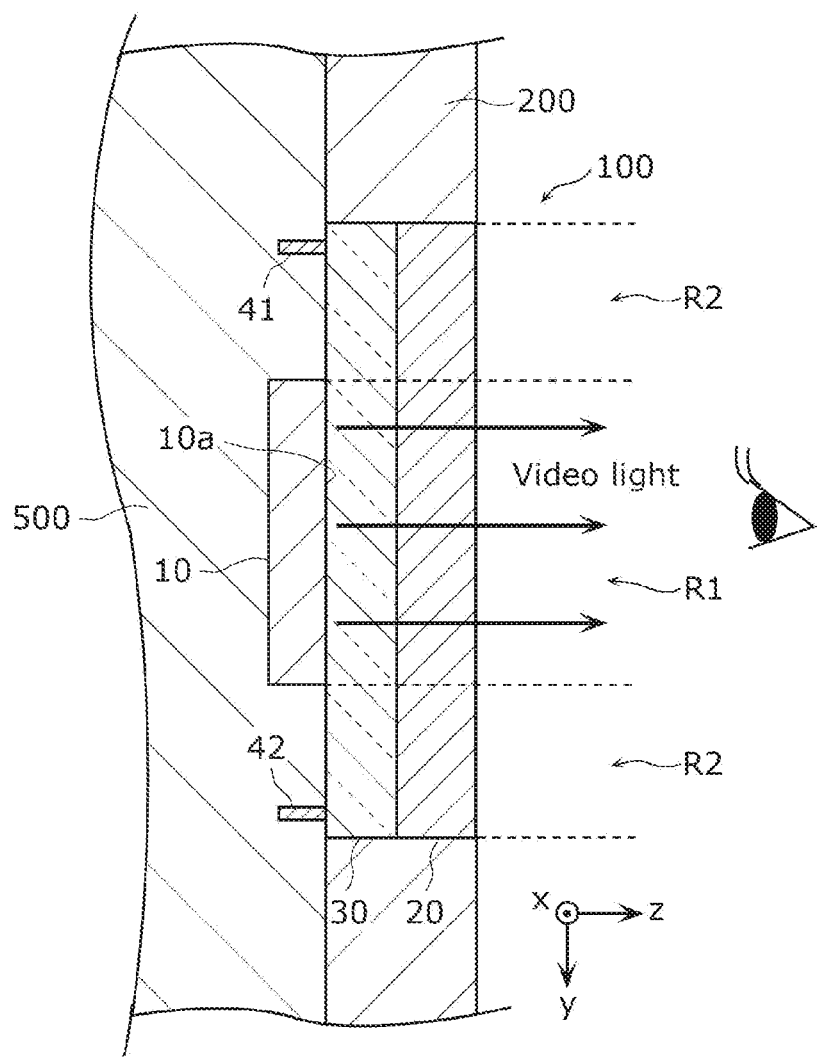
FIG. 13 is a cross sectional view schematically illustrating a cross sectional structure of a display device according to Variation 2 of the embodiment.

Next, a display device according to a variation is described with reference to FIG. 13. FIG. 13 is a cross sectional view schematically illustrating a cross sectional structure of display device 100 according to this variation. Specifically, FIG. 13 is a cross sectional view of display device 100 when cut along line XIII-XIII illustrated in FIG. 10A.

Display device 100 according to this variation is different from display device 100 in that display 10 is not disposed in a vacant space and an object is disposed around display 10. The object disposed around display 10 may be an object (for example, a constructed object) provided to the target to which display device 100 is attached, or an object according to the target. In other words, the object may be an object which does not have a function required as display device 100. Hereinafter, an example in which the target to which display device 100 is attached is wall 200 is described. It is to be noted that insulating material 500 is disposed to display device 100, in addition to the configuration of display device 100 illustrated in FIG. 3. The configuration of display device 100 here is similar to the configuration in the embodiment, and thus descriptions thereof are omitted or simplified hereinafter.

As illustrated in FIG. 13, decorative sheet 20 has a light transmitting property and is disposed on the display 10a side of display 10. In this variation, decorative sheet 20 is configured to cover insulating material 500 around display screen 10a and display 10 in a front view of display screen 10a. Decorative sheet 20 includes first region R1 which overlaps with display screen 10a in the front view and second region R2 which does not overlap with display screen 10a in the front view. In this variation, second region R2 is a region which covers insulating material 500 in the front view.

Insulating material 500 is an object disposed around display 10 in the front view. Insulating material 500 is an object according to the attachment position of display device 100. Insulating material 500 is one example of a building material.

It is to be noted that, in FIG. 13, insulating material 500 is provided in contact with each of display 10, transparent plate 30, first illuminance sensor 41, and second illuminance sensor 42, as a non-limiting example. Alternatively, insulating material 500 may be disposed apart from at least one of display 10, transparent plate 30, first illuminance sensor 41, and second illuminance sensor 42.

Although insulating material 500 is provided in the entirety of second region R2 in the front view in FIG. 13, insulating material 500 is provided in at least a part of second region R2.

It is to be noted that display device 100 may be provided with insulating material 500 before display device 100 is set to a target (for example, wall 200), and display device 100 with insulating material 500 may be attached to the target. For example, display device 100 may include insulating material 500.

It is to be noted that information regarding the object according to the attachment position of display device 100 is obtained in advance. In addition, a border line according to the object is used as the border line of occurrence of black level degradation according to this variation (for example, the border line corresponding to the border line of occurrence of black level degradation indicated in FIG. 5). For example, a border line of occurrence of black level degradation may be obtained in advance for each object according to the attachment position of display device 100. Stated differently, the first information can be said to indicate the illuminance of ambient light around display device 100 disposed and the relationship between the illuminance and the appearances of the third region and second region R2 on decorative sheet 20. The third region includes insulating material 500 provided thereon.

As describe above, in display device 100, the object (for example, insulating material 500) according to the attachment position of display device 100 is disposed in the at least part around display 10 in the front view, and second region R2 is the region which covers the object in the front view.

In this way, even when the object is disposed around display 10, display device 100 is capable of inhibiting display 10 from being visually recognized by the user.

It is to be noted that the object according to the attachment position of display device 100 is not limited to insulating material 500 and may be another object. When display device 100 is attached to wall 200, the object may be made of, for example, wood, concrete, resin, or the like. Alternatively, the object may be an insulating material such as heat dissipation silicone for releasing heat that is generated in display 10. Alternatively, the object may be a sheet-shaped or plate-shaped object. Alternatively, the object may be provided to fill the space around display 10. Alternatively, the object may have light transmitting property, light shielding property, light diffusing property, or light reflecting property.

Variation 3 of the Embodiment

Next, a display device according to a variation is described with reference to FIG. 14. FIG. 14 is a flow chart indicating operations by display device 100 according to this variation. Display device 100 according to this variation is different from display device 100 according to the embodiment in that it detects illuminances at predetermined time intervals in a period in which a video is displayed, and controls the luminance of the video according to each illuminance detected. Differences are mainly described hereinafter, and operations similar to those in the embodiment are assigned with the same reference sings and descriptions thereof are omitted.

As illustrated in FIG. 14, when display of the video has not finished (No in S16), controller 50 determines whether a predetermined period has elapsed after the previous luminance control of the video (S37). For example, controller 50 may include a timer device (for example, a real time clock) which measures a current time of a day, and may make a determination in Step S37 based on the result of time measured by the timer device.

When the predetermined period has elapsed (Yes in S37), controller 50 returns to Step S11, and obtains the illuminances from first illuminance sensor 41 and second illuminance sensor 42 during the display of the video, and continues the processing of Step S12 and the following steps. When the predetermined period has elapsed (No in S37), controller 50 finishes the processing. It is to be noted that the predetermined period may be set in advance, and stored in storage 60. The predetermined period may be, for example, 10 seconds, 1 minute, or another period.

It is to be noted that the determination in Step S37 may not be performed. Controller 50 does not always need to obtain illuminances for each predetermined period as long as controller 50 repeatedly obtains illuminances in a period in which a video is displayed and controls the luminance of the video each time the illuminances are obtained. The timings at which controller 50 obtains illuminances in the period in which the video is displayed may be random for example.

As described above, the illuminance sensor unit of display device 100 according to this variation repeatedly detects illuminances in the period in which the video is displayed on display screen 10a, and controller 50 controls the luminance of the video according to the illuminances each time the illuminances are obtained.

In this way, when the illuminance of the outside light has significantly changed while the video is being displayed, display device 100 is capable of controlling the luminance of the video according to the change in the illuminance. Thus, even when the ambient light around display device 100 has changed while the video is being displayed, display device 100 is capable of inhibiting display 10 from being visually recognized by the user.

It is to be noted that display device 100 according to this embodiment is capable of efficiently inhibiting the display from being visually recognized by the user when, for example, display device 100 is attached to a target which is provided in a space in which illuminance periodically changes.

Other Embodiments

Although the display device according to the embodiment has been described based on the embodiment, the present disclosure is not limited to the embodiment etc.

Thus, the elements described in the accompanying drawings and the detailed description include not only elements essential to solve the technical problem, but elements that are not necessarily essential to solve the technical problem but are provided for the sake of exemplifying the techniques as well. As such, inclusion of these non-essential elements in the accompanying drawings and the detailed description should not be taken to mean that these non-essential elements are essential.

For example, another light-transmissive element may be disposed between the respective elements in the display device according to the embodiment etc. The other element may be, a half mirror, a touch panel, a heat-resistant sheet, or the like.

Although the above embodiment describes the example in which the first information is information based on the inhibition of difference between the luminance in the black display region and the luminance in the space on the decorative sheet, that is information based on inhibition of black level degradation, the example is a non-limiting example. The first information may be information based on inhibition of difference between the color (for example, a color temperature) in the black level region and the color (for example, a color temperature) in the space on the decorative sheet. The colors on the decorative sheet are examples of appearances on the decorative sheet. For example, depending on the surface treatment on the surface of the display, it is possible to reflect only ambient light having a particular wavelength. In such a case, by controlling the luminance of a video using first information which indicates the relationship between the illuminance and the luminance and makes it possible to inhibit the difference between the color in the black display region and the color in the space on the decorative sheet, the display device is capable of inhibiting the difference in color from being visually recognized by a user and inhibiting the display from being visually recognized by the user.

In addition, when a plurality of display devices according to the embodiment etc., are arranged in the same space, it is only necessary that at least one of the plurality of display devices includes an illuminance sensor unit. The other display device may obtain detected illuminances from the illuminance sensor unit of the at least one display device.

Although the above embodiment etc., describes the example in which the controller controls the luminance of the video using the higher one of the illuminances obtained, the example is a non-limiting example. When a plurality of illuminances are obtained, the controller may control the luminance of the video using at least one of the average value, the mode, the minimum value of the plurality of illuminances. For example, in Step S12 in each of FIGS. 6, 9, and 14, the illuminance calculated through computing of the average value for example may be determined as the illuminance to be used for luminance control.

In the above embodiment, the display device is described as arranged embedded in an object, but the display device is not limited to being embedded in an object. For example, the display device may be arranged on the surface of an object (for example, the surface of a wall). For example, the display device may be a wall-mounted display device.

In addition, in the above embodiment, each of constituent elements may be implemented as dedicated hardware or implemented by executing a software program suitable for the constituent element. Each constituent element may be implemented by means of a program executer such as a central processing unit (CPU), a processor, or the like reading out and executing a software program recorded on a recording medium such as a hard disc or a semiconductor memory.

In addition, the controller described in the above embodiment, etc., may be implemented as software, or may be implemented typically as an LSI which is an integrated circuit. The constituent elements may be made as separate individual chips, or as a single chip to include a part or all thereof. Although LSI is mentioned here, designations of IC, system LSI, super LSI, and ultra LSI are used due to a difference in the degree of integration. Furthermore, the means for circuit integration is not limited to an LSI, and implementation with a dedicated circuit (a general circuit for executing a dedicated program) or a general-purpose processor is also available. It is also possible to use a field programmable gate array (FPGA) that is programmable after the LSI is manufactured, and a reconfigurable processor in which connections and settings of circuit cells within the LSI are reconfigurable. Furthermore, if integrated circuit technology that replaces LSI appear through progress in semiconductor technology or other derived technology, that technology can naturally be used to carry out integration of the constituent elements.

In addition, each of the general or specific aspect of the present disclosure may be implemented as a system, a device, a method, an integrated circuit, a computer program, or a computer readable medium such as a CD-ROM. Alternatively, each of the general or specific aspect of the present disclosure may be implemented as any combination of, systems, devices, methods, integrated circuits, computer programs, or recording media. For example, the present disclosure may be implemented as a control method that is executed by a display device, or as a program for causing a computer to execute the control method.

In addition, the order of the processes on the operation performed by the display device in the above embodiment is one example. The order of the processes may be changed, or the processes may be executed in parallel. Alternatively, a part of the processes may be omitted.

Various modifications to the above embodiments that may be conceived by those skilled in the art, as well as embodiments resulting from arbitrary combinations of elements and functions from different embodiments that do not depart from the scope of the present disclosure are included in the present disclosure.

INDUSTRIAL APPLICABILITY

The present disclosure is applicable to display devices that are mounted onto an object.

The invention claimed is:

1. A display device comprising:
a display which includes a display screen on which a video is displayed;
a decorative sheet which is disposed on a side of the display screen of the display, is larger than the display screen in a front view of the display screen, and covers the display screen, the decorative sheet including a first region which overlaps with the display screen in the front view and a second region which does not overlap with the display screen in the front view; and
a controller which controls a luminance of the video that is displayed by the display, based on (i) an illuminance of ambient light around the display and the decorative sheet and (ii) first information indicating a relationship between the illuminance and appearances of a third region and the second region on the decorative sheet, the third region corresponding to a black display region of the video in the first region.

2. The display device according to claim 1,
wherein the first information includes an upper-limit luminance of the video, the upper-limit luminance being relative to the illuminance of the ambient light and inhibiting occurrence of black level degradation in the black display region on the decorative sheet, and
the controller controls the luminance of the video so that the luminance of the video is less than or equal to the upper-limit luminance which is relative to the illuminance.

3. The display device according to claim 1, further comprising:
an illuminance sensor unit which is disposed on a side of the decorative sheet facing towards the display and detects the illuminance of the ambient light that has passed through the decorative sheet.

4. The display device according to claim 3,
wherein the illuminance sensor unit includes a first illuminance sensor and a second illuminance sensor which are arranged at mutually different positions in the front view, and
the controller controls the luminance of the video using a higher one of an illuminance obtained from the first illuminance sensor and an illuminance obtained from the second illuminance sensor.

5. The display device according to claim 4,
wherein the decorative sheet includes a portion corresponding to the first illuminance sensor and a portion corresponding to the second illuminance sensor that are structurally identical to each other in the front view.

6. The display device according to claim 4,
wherein the decorative sheet includes a portion corresponding to the first illuminance sensor and a portion corresponding to the second illuminance sensor that have a same property to light.

7. The display device according to claim 3,
wherein the illuminance sensor unit detects the illuminance immediately before the video is displayed on the display screen, and
the controller controls the luminance of the video in a period in which the video is displayed, using the illuminance.

8. The display device according to claim 3,
wherein the illuminance sensor unit repeatedly detects an illuminance of ambient light in a period in which the video is displayed on the display screen, and
every time the illuminance of the ambient light is obtained, the controller controls the luminance of the video according to the illuminance obtained.

9. The display device according to claim 1,
wherein the controller obtains the illuminance from an illuminance sensor unit which is provided outside of the display device, calculates an illuminance of the ambient light after passing though the decorative sheet from the illuminance obtained, based on an optical property of the decorative sheet, and controls the luminance of the video using the illuminance calculated.

10. The display device according to claim 1,
wherein the controller further controls the luminance of the video, based on second information indicating a relationship between the illuminance and a visibility of the video.

11. The display device according to claim 2,
wherein the controller further controls the luminance of the video, based on second information indicating a relationship between the illuminance and a visibility of the video,
the second information includes a lower-limit luminance of the video for obtaining a desired visibility, the lower-limit luminance being relative to the illuminance of the ambient light, and
the controller controls the luminance of the video so that the luminance is more than or equal to the lower-limit luminance and less than or equal to the upper-limit luminance, the lower-limit luminance and the upper-limit luminance being relative to the illuminance.

12. The display device according to claim 1,
wherein the display is configured to include a liquid crystal display.

13. The display device according to claim 1,
wherein a space is formed around the display in the front view, and
the second region is a region which covers the space in the front view.

14. The display device according to claim 1,
wherein, in the front view, an object which is relative to an attachment position of the display device is disposed in at least a part of a surrounding region around the display, and
the second region is a region that covers the object in the front view.

15. A method of controlling a display device including a display which includes a display screen on which a video is displayed; a decorative sheet which is disposed on a side of the display screen of the display, is larger than the display screen in a front view of the display screen, and covers the display screen, the decorative sheet including a first region which overlaps with the display screen in the front view and a second region which does not overlap with the display screen in the front view, the method comprising:
controlling a luminance of the video that is displayed by the display, based on (i) an illuminance of ambient light around the display device and (ii) information indicating a relationship between the illuminance and appearances of a third region and the second region on the decorative sheet, the third region corresponding to a black display region of the video in the first region.

* * * * *